United States Patent
Chen et al.

(10) Patent No.: US 11,659,161 B2
(45) Date of Patent: May 23, 2023

(54) REFERENCE FRAME OBTAINING METHOD AND APPARATUS APPLIED TO BIDIRECTIONAL INTER PREDICTION

(71) Applicant: Huawei Technologies Co., Ltd., Shenzhen (CN)

(72) Inventors: Huanbang Chen, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/189,577

(22) Filed: Mar. 2, 2021

(65) Prior Publication Data

US 2021/0185310 A1    Jun. 17, 2021

Related U.S. Application Data

(63) Continuation of application No. PCT/CN2019/094106, filed on Jun. 30, 2019.

(Continued)

(51) Int. Cl.
  *H04N 19/105* (2014.01)
  *H04N 19/159* (2014.01)
  (Continued)

(52) U.S. Cl.
  CPC ......... *H04N 19/105* (2014.11); *H04N 19/137* (2014.11); *H04N 19/159* (2014.11); *H04N 19/172* (2014.11); *H04N 19/176* (2014.11)

(58) Field of Classification Search
  CPC .. H04N 19/105; H04N 19/159; H04N 19/137; H04N 19/172; H04N 19/176
  See application file for complete search history.

(56) References Cited

U.S. PATENT DOCUMENTS 11,310,521 B2 *   4/2022   Sethuraman ......... H04N 19/523
2005/0117646 A1   6/2005   Joch et al.
(Continued)

FOREIGN PATENT DOCUMENTS

CN   101309427 A   11/2008
CN   103339936 A   10/2013
(Continued)

OTHER PUBLICATIONS

Schwarz, S., "An Application of Unified Reference Picture List for Motion-Compensated Video Compression," 2016 Picture Coding Symposium (PCS), Date of Conference: Dec. 4-7, 2016, Date Added to IEEE Xplore: Apr. 24, 2017, 5 pages.

(Continued)

*Primary Examiner* — Kyle M Lotfi
(74) *Attorney, Agent, or Firm* — Conley Rose, P.C.

(57) ABSTRACT

A reference frame obtaining method includes determining a first reference frame list and a second reference frame list of a current picture block, determining, from the first reference frame list, whether an X-directional reference frame x1 satisfying a condition A1 exists, determining, from the second reference frame list, whether a Y-directional reference frame y1 satisfying a condition B1 exists, and in response to determining that the X-directional reference frame x1 exists and determining that the Y-directional reference frame y1 exists, obtaining index values (R1, R2) of bidirectional reference frames of the current picture block.

21 Claims, 5 Drawing Sheets

Related U.S. Application Data

(60) Provisional application No. 62/734,226, filed on Sep. 20, 2018, provisional application No. 62/727,534, filed on Sep. 5, 2018, provisional application No. 62/726,975, filed on Sep. 4, 2018.

(51) Int. Cl.
*H04N 19/172* (2014.01)
*H04N 19/176* (2014.01)
*H04N 19/137* (2014.01)

(56) References Cited

U.S. PATENT DOCUMENTS

| | | |
|---|---|---|
| 2007/0047649 A1 | 3/2007 | Suzuki et al. |
| 2012/0189058 A1 | 7/2012 | Chen et al. |
| 2015/0103911 A1 | 4/2015 | Lee |
| 2018/0278949 A1 | 9/2018 | Karczewicz et al. |
| 2019/0230363 A1 | 7/2019 | An et al. |
| 2020/0128258 A1* | 4/2020 | Chen ............. H04N 19/139 |

FOREIGN PATENT DOCUMENTS

| | | |
|---|---|---|
| CN | 104365101 A | 2/2015 |
| CN | 104717513 A | 6/2015 |
| EP | 2783510 A1 | 10/2014 |
| EP | 2840793 A1 | 2/2015 |
| EP | 3079363 A1 | 10/2016 |
| EP | 2779650 B1 | 4/2017 |
| EP | 3509297 A1 | 7/2019 |
| JP | 2015516753 A | 6/2015 |
| JP | 2017200209 A | 11/2017 |
| JP | 2020511859 A | 4/2020 |
| WO | 2013078248 A1 | 5/2013 |
| WO | WO-2013078248 A1 * | 5/2013 ....... H04N 19/00575 |
| WO | 2018058526 A1 | 4/2018 |
| WO | 2018058622 A1 | 4/2018 |

OTHER PUBLICATIONS

ITU-T H.264, "Series H: Audiovisual and Multimedia Systems Infrastructure of audiovisual services—Coding of moving video Advanced video coding for generic audiovisual services," Apr. 2017, 812 pages.

JVET-J0063, Huanbang Chen et al., "Symmetrical mode for bi-prediction," Joint Video Exploration Team (JVET) of ITU-T SG 16 WP 3 and ISO/IEC JTC 1/SC 29/WG 11, 10th Meeting: San Diego, USA, Apr. 10-21, 2018, 5 pages.

\* cited by examiner

REFERENCE FRAME OBTAINING METHOD AND APPARATUS APPLIED TO BIDIRECTIONAL INTER PREDICTION

CROSS-REFERENCE TO RELATED APPLICATIONS

This application is a continuation application of International Patent Application No. PCT/CN2019/094106 filed on Jun. 30, 2019, which claims priority to U.S. Patent Application No. 62/726,975 filed on Sep. 4, 2018, U.S. Patent Application No. 62/727,534 filed on Sep. 5, 2018, and U.S. Patent Application No. 62/734,226 filed on Sep. 20, 2018, all of which are hereby incorporated by reference in their entireties.

TECHNICAL FIELD

Embodiments of this application relate to the field of video picture coding technologies, and in particular, to a bidirectional inter prediction method and apparatus.

BACKGROUND

In a video coding technology, a prediction picture block of a current picture block may be generated based on only one reference picture block (which is referred to as unidirectional inter prediction), or a prediction picture block of a current picture block may be generated based on at least two reference picture blocks (which is referred to as bidirectional inter prediction). The at least two reference picture blocks may be from a same reference frame or different reference frames.

To enable a decoder side and an encoder side to use a same reference picture block, the encoder side needs to send motion information of each picture block to the decoder side through a bitstream. Usually, motion information of the current picture block includes an index value of a reference frame, a motion vector predictor (MVP) identifier, and a motion vector difference (MVD). The decoder side may find a correct reference picture block in a selected reference frame based on the index value of the reference frame, the MVP identifier, and the MVD.

Correspondingly, in bidirectional inter prediction, the encoder side needs to send motion information of each picture block in each direction to the decoder side. Consequently, the motion information occupies a comparatively large quantity of transmission resources. This reduces effective utilization of transmission resources, a transmission rate, and coding compression efficiency.

SUMMARY

Embodiments of this application provide a bidirectional inter prediction method and apparatus, to resolve a problem that effective utilization of transmission resources, a transmission rate, and coding compression efficiency are reduced because motion information occupies a comparatively large quantity of transmission resources.

To achieve the foregoing objective, the following technical solutions are used in the embodiments of this application.

According to a first aspect, a bidirectional inter prediction method is provided. The method includes obtaining indication information used to indicate to determine second motion information based on first motion information, where the first motion information is motion information of a current picture block in a first direction, and the second motion information is motion information of the current picture block in a second direction, obtaining the first motion information, determining the second motion information based on the obtained first motion information, and determining a prediction sample of the current picture block based on the obtained first motion information and the determined second motion information.

According to the bidirectional inter prediction method provided in this application, after the indication information is obtained, the second motion information is determined based on the first motion information. In this way, a bitstream needs to include only the indication information and the first motion information, and no longer needs to include the second motion information. In comparison with a conventional technology in which a bitstream includes motion information of each picture block in each direction, the bidirectional inter prediction method provided in this application effectively reduces motion information included in the bitstream, and improves effective utilization of transmission resources, a transmission rate, and a coding rate.

Optionally, in a possible implementation of this application, the method for "determining the second motion information based on the first motion information" is obtaining an index value of a first reference frame in the first motion information, and determining a sequence number of the first reference frame based on the index value of the first reference frame and a first reference frame list, where the first reference frame is a reference frame of the current picture block in the first direction, and the index value of the first reference frame is a number of the first reference frame in the first reference frame list, obtaining an index value of a second reference frame, and determining a sequence number of the second reference frame based on the index value of the second reference frame and a second reference frame list, where the second reference frame is a reference frame of the current picture block in the second direction, and the index value of the second reference frame is a number of the second reference frame in the second reference frame list, determining a first motion vector based on a first MVD and a first MVP identifier that are in the first motion information, where the first motion vector is a motion vector of the current picture block in the first direction, and determining a second motion vector in the second motion information according to the following formula, where the second motion vector is a motion vector of the current picture block in the second direction:

$$mv\_lY = \frac{POC\_Cur - POC\_listY}{POC\_Cur\_POC\_listX} \times mv\_lX.$$

In this formula, mv_lY represents the second motion vector, POC_Cur represents a sequence number of a current frame, POC_listX represents the sequence number of the first reference frame, POC_listY represents the sequence number of the second reference frame, and mv_lX represents the first motion vector.

Optionally, in another possible implementation of this application, the method for "determining the second motion information based on the first motion information" is obtaining an index value of a first reference frame in the first motion information, and determining a sequence number of the first reference frame based on the index value of the first reference frame and a first reference frame list, where the first reference frame is a reference frame of the current picture block in the first direction, and the index value of the first reference frame is a number of the first reference frame in the first reference frame list, obtaining an index value of the second reference frame, and determining a sequence number of the second reference frame based on the index value of the second reference frame and a second reference frame list, where the second reference frame is a reference frame of the current picture block in the second direction, and the index value of the second reference frame is a number of the second reference frame in the second reference frame list, determining a first motion vector based on a first MVD and a first MVP identifier that are in the first motion information, where the first motion vector is a motion vector of the current picture block in the first direction, and in a case in which the first reference frame is a forward reference frame of the current picture block and the second reference frame is a backward reference frame of the current picture block, or in a case in which the first reference frame is a backward reference frame of the current picture block and the second reference frame is a forward reference frame of the current picture block, or in a case in which the first reference frame and the second reference frame each are a forward reference frame of the current picture block, or in a case in which the first reference frame and the second reference frame each are a backward reference frame of the current picture block, determining a second motion vector in the second motion information according to Formula mv_1Y=−mv_1X, where the second motion vector is a motion vector of the current picture block in the second direction. In this formula, mv_1Y represents the second motion vector, and mv_1X represents the first motion vector.

Optionally, in another possible implementation of this application, the method for "determining the second motion information based on the first motion information" is determining a second motion vector in the second motion information according to Formula mv_1Y=−mv_1X, where the second motion vector is a motion vector of the current picture block in the second direction. In this formula, mv_1Y represents the second motion vector, and mv_1X represents a first motion vector.

Both the "case in which the first reference frame is a forward reference frame of the current picture block and the second reference frame is a backward reference frame of the current picture block" and the "case in which when the first reference frame is a backward reference frame of the current picture block and the second reference frame is a forward reference frame of the current picture block" may be represented by using Formula (picture order count (POC)$_{cur}$−POC$_{listX}$)*(POC$_{listY}$−POC$_{cur}$)>0 or Formula POC_listY=2*POC_Cur−POC_listX. This is not specifically limited in this application.

In addition, both the "case in which the first reference frame and the second reference frame each are a forward reference frame of the current picture block" and the "case in which the first reference frame and the second reference frame each are a backward reference frame of the current picture block" may be represented by using Formula (POC_Cur−POC_listX)*(POC_listY−POC_Cur)<0.

Optionally, in another possible implementation of this application, the method for "determining the second motion information based on the first motion information" is obtaining an index value of a first reference frame and a first MVD in the first motion information, determining a sequence number of the first reference frame based on the index value of the first reference frame and a first reference frame list, where the first reference frame is a reference frame of the current picture block in the first direction, and the index value of the first reference frame is a number of the first reference frame in the first reference frame list, obtaining an index value of a second reference frame, determining a sequence number of the second reference frame based on the index value of the second reference frame and a second reference frame list, and determining a second predicted motion vector based on the index value of the second reference frame and a second candidate predicted motion vector list, where the second predicted motion vector is a predicted motion vector of the current picture block in the second direction, the second reference frame is a reference frame of the current picture block in the second direction, and the index value of the second reference frame is a number of the second reference frame in the second reference frame list, determining a second MVD in the second motion information according to the following formula, and determining a second motion vector based on the second predicted motion vector and the second MVD, where the second motion vector is a motion vector of the current picture block in the second direction:

$$\text{mvd\_1Y} = \frac{\text{POC\_Cur} - \text{POC\_listY}}{\text{POC\_Cur\_POC\_listX}} \times \text{mvd\_1X}.$$

In this formula, mvd_1Y represents the second MVD, POC_Cur represents a sequence number of a current frame, POC_listX represents the sequence number of the first reference frame, POC_listY represents the sequence number of the second reference frame, and mvd_1X represents the first MVD.

Optionally, in another possible implementation of this application, the method for "determining the second motion information based on the first motion information" is obtaining an index value of a first reference frame and a first motion vector in the first motion information, determining a sequence number of the first reference frame based on the index value of the first reference frame and a first reference frame list, where the first reference frame is a reference frame of the current picture block in the first direction, and the index value of the first reference frame is a number of the first reference frame in the first reference frame list, obtaining an index value of a second reference frame, determining a sequence number of the second reference frame based on the index value of the second reference frame and a second reference frame list, and determining a second predicted motion vector based on the index value of the second reference frame and a second candidate predicted motion vector list, where the second predicted motion vector is a predicted motion vector of the current picture block in the second direction, the second reference frame is a reference frame of the current picture block in the second direction, and the index value of the second reference frame is a number of the second reference frame in the second reference frame list, in a case in which the first reference frame is a forward reference frame of the current picture block and the second reference frame is a backward reference frame of the current picture block, or in a case in which the first reference frame is a backward reference frame of the current picture block and the second reference frame is a forward reference frame of the current picture block, or in a case in which the first reference frame and the second reference frame each are a forward reference frame of the current picture block, or in a case in which the first reference frame and the second reference frame each are a backward reference frame of the current picture block, determining a second MVD in the second motion information according to Formula mvd_lY=−mvd_lX, where in this formula, mvd_lY represents the second MVD, and mvd_lX represents the first MVD, and determining a second motion vector based on the second predicted motion vector and the second MVD, where the second motion vector is a motion vector of the current picture block in the second direction.

Optionally, in another possible implementation of this application, the method for "determining the second motion information based on the first motion information" is determining a second MVD in the second motion information according to Formula mvd_lY=−mvd_lX, where in this formula, mvd_lY represents the second MVD, and mvd_lX represents a first MVD, and determining a second motion vector based on a second predicted motion vector and the second MVD, where the second motion vector is a motion vector of the current picture block in the second direction.

Likewise, both the "case in which the first reference frame is a forward reference frame of the current picture block and the second reference frame is a backward reference frame of the current picture block" and the "case in which when the first reference frame is a backward reference frame of the current picture block and the second reference frame is a forward reference frame of the current picture block" may be represented by using Formula (POC_Cur−POC_listX)*(POC_listY−POC_Cur)>0 or Formula POC_listY=2*POC_Cur−POC_listX. This is not specifically limited in this application.

Both the "case in which the first reference frame and the second reference frame each are a forward reference frame of the current picture block" and the "case in which the first reference frame and the second reference frame each are a backward reference frame of the current picture block" may be represented by using Formula (POC_Cur−POC_listX)*(POC_listY−POC_Cur)<0.

It can be learned that, the bidirectional inter prediction method provided in this application may be determining the second motion vector based on the first motion vector, or determining the second MVD based on the first MVD, and determining the second motion vector based on the second MVD.

Optionally, in another possible implementation of this application, the method for "obtaining an index value of a second reference frame" is calculating a first sequence number based on a sequence number of a current frame and the sequence number of the first reference frame according to Formula POC_listY0=2*POC_Cur−POC_listX, where POC_Cur represents the sequence number of the current frame, POC_listX represents the sequence number of the first reference frame, and POC_listY0 represents the first sequence number, and when the second reference frame list includes the first sequence number, determining, as the index value of the second reference frame, a number of a reference frame represented by the first sequence number in the second reference frame list.

Optionally, in another possible implementation of this application, the method for "obtaining an index value of a second reference frame" is calculating a second sequence number based on a sequence number of a current frame and the sequence number of the first reference frame according to Formula (POC_Cur−POC_listX)*(POC_listY0'−POC_Cur)>0, where POC_listY0' represents the second sequence number, and when the second reference frame list includes the second sequence number, determining, as the index value of the second reference frame, a number of a reference frame represented by the second sequence number in the second reference frame list.

Optionally, in another possible implementation of this application, the method for "obtaining an index value of a second reference frame" is calculating a third sequence number based on a sequence number of a current frame and the sequence number of the first reference frame according to Formula POC_listX≠POC_listY0", where POC_listY0" represents the third sequence number, and determining, as the index value of the second reference frame, a number of a reference frame represented by the third sequence number in the second reference frame list.

Optionally, in another possible implementation of this application, the method for "obtaining an index value of a second reference frame" is calculating a first sequence number based on a sequence number of a current frame and the sequence number of the first reference frame according to Formula POC_listY0=2*POC_Cur−POC_listX, where POC_Cur represents the sequence number of the current frame, POC_listX represents the sequence number of the first reference frame, and POC_listY0 represents the first sequence number, when the second reference frame list includes the first sequence number, determining, as the index value of the second reference frame, a number of a reference frame represented by the first sequence number in the second reference frame list, or when the second reference frame list does not include the first sequence number, calculating a second sequence number based on the sequence number of the current frame and the sequence number of the first reference frame according to Formula (POC_Cur−POC_listX)*(POC_listY0'−POC_Cur)>0, where POC_listY0' represents the second sequence number, and when the second reference frame list includes the second sequence number, determining, as the index value of the second reference frame, a number of a reference frame represented by the second sequence number in the second reference frame list, or when the second reference frame list does not include the second sequence number, calculating a third sequence number based on the sequence number of the current frame and the sequence number of the first reference frame according to Formula POC_listX≠POC_listY0", where POC_listY0" represents the third sequence number, and determining, as the index value of the second reference frame, a number of the reference frame represented by the third sequence number in the second reference frame list.

Optionally, in another possible implementation of this application, the method for "obtaining an index value of a second reference frame" is parsing a bitstream to obtain the index value of the second reference frame.

It can be learned that there may be a plurality of methods for "obtaining an index value of a second reference frame" in this application. A specific method for obtaining the index value of the second reference frame needs to be determined based on actual requirements or be preset.

According to a second aspect, a bidirectional inter prediction apparatus is provided. The bidirectional inter prediction apparatus includes an obtaining unit and a determining unit.

Specifically, the obtaining unit is configured to obtain indication information, where the indication information is used to indicate to determine second motion information based on first motion information, the first motion information is motion information of a current picture block in a first direction, and the second motion information is motion information of the current picture block in a second direction, and obtain the first motion information. The determining unit is configured to determine the second motion information based on the first motion information obtained by the obtaining unit, and determine a prediction sample of the current picture block based on the first motion information and the second motion information.

Optionally, in a possible implementation of this application, the determining unit is specifically configured to obtain an index value of a first reference frame in the first motion information, and determine a sequence number of the first reference frame based on the index value of the first reference frame and a first reference frame list, where the first reference frame is a reference frame of the current picture block in the first direction, and the index value of the first reference frame is a number of the first reference frame in the first reference frame list, obtain an index value of a second reference frame, and determine a sequence number of the second reference frame based on the index value of the second reference frame and a second reference frame list, where the second reference frame is a reference frame of the current picture block in the second direction, and the index value of the second reference frame is a number of the second reference frame in the second reference frame list, determine a first motion vector based on a first MVD and a first MVP identifier that are in the first motion information, where the first motion vector is a motion vector of the current picture block in the first direction, and determine a second motion vector in the second motion information according to the following formula, where the second motion vector is a motion vector of the current picture block in the second direction:

$$mv\_lY = \frac{POC\_Cur - POC\_listY}{POC\_Cur\_POC\_listX} \times mv\_lX.$$

mv_lY represents the second motion vector, POC_Cur represents the sequence number of the current frame, POC_listX represents the sequence number of the first reference frame, POC_listY represents the sequence number of the second reference frame, and mv_lX represents the first motion vector.

Optionally, in another possible implementation of this application, the determining unit is specifically configured to obtain an index value of a first reference frame in the first motion information, and determine a sequence number of the first reference frame based on the index value of the first reference frame and a first reference frame list, where the first reference frame is a reference frame of the current picture block in the first direction, and the index value of the first reference frame is a number of the first reference frame in the first reference frame list, obtain an index value of the second reference frame, and determine a sequence number of the second reference frame based on the index value of the second reference frame and a second reference frame list, where the second reference frame is a reference frame of the current picture block in the second direction, and the index value of the second reference frame is a number of the second reference frame in the second reference frame list, determine a first motion vector based on a first MVD and a first MVP identifier that are in the first motion information, where the first motion vector is a motion vector of the current picture block in the first direction, and in a case in which the first reference frame is a forward reference frame of the current picture block and the second reference frame is a backward reference frame of the current picture block, or in a case in which the first reference frame is a backward reference frame of the current picture block and the second reference frame is a forward reference frame of the current picture block, or in a case in which the first reference frame and the second reference frame each are a forward reference frame of the current picture block, or in a case in which the first reference frame and the second reference frame each are a backward reference frame of the current picture block, determine a second motion vector in the second motion information according to Formula mv_lY=−mv_lX, where the second motion vector is a motion vector of the current picture block in the second direction. In this formula, mv_lY represents the second motion vector, and mv_lX represents the first motion vector.

Optionally, in another possible implementation of this application, the determining unit is specifically configured to determine a second motion vector in the second motion information according to Formula mv_lY=−mv_lX, where the second motion vector is a motion vector of the current picture block in the second direction. In this formula, mv_lY represents the second motion vector, and mv_lX represents a first motion vector.

Optionally, in another possible implementation of this application, the determining unit is specifically configured to obtain an index value of a first reference frame and a first MVD in the first motion information, determine a sequence number of the first reference frame based on the index value of the first reference frame and a first reference frame list, where the first reference frame is a reference frame of the current picture block in the first direction, and the index value of the first reference frame is a number of the first reference frame in the first reference frame list, obtain an index value of a second reference frame, determine a sequence number of the second reference frame based on the index value of the second reference frame and a second reference frame list, and determine a second predicted motion vector based on the index value of the second reference frame and a second candidate predicted motion vector list, where the second predicted motion vector is a predicted motion vector of the current picture block in the second direction, the second reference frame is a reference frame of the current picture block in the second direction, and the index value of the second reference frame is a number of the second reference frame in the second reference frame list, determine a second MVD in the second motion information according to the following formula, and determine a second motion vector based on the second predicted motion vector and the second MVD, where the second motion vector is a motion vector of the current picture block in the second direction:

$$mvd\_lY = \frac{POC\_Cur - POC\_listY}{POC\_Cur\_POC\_listX} \times mvd\_lX.$$

mvd_lY represents the second MVD, POC_Cur represents a sequence number of a current frame, POC_listX represents the sequence number of the first reference frame, POC_listY represents the sequence number of the second reference frame, and mvd_lX represents the first MVD.

Optionally, in another possible implementation of this application, the determining unit is specifically configured to obtain an index value of a first reference frame and a first motion vector in the first motion information, determine a sequence number of the first reference frame based on the index value of the first reference frame and a first reference frame list, where the first reference frame is a reference frame of the current picture block in the first direction, and the index value of the first reference frame is a number of the first reference frame in the first reference frame list, obtain an index value of a second reference frame, determine a sequence number of the second reference frame based on the index value of the second reference frame and a second reference frame list, and determine a second predicted motion vector based on the index value of the second reference frame and a second candidate predicted motion vector list, where the second predicted motion vector is a predicted motion vector of the current picture block in the second direction, the second reference frame is a reference frame of the current picture block in the second direction, and the index value of the second reference frame is a number of the second reference frame in the second reference frame list, in a case in which the first reference frame is a forward reference frame of the current picture block and the second reference frame is a backward reference frame of the current picture block, or in a case in which the first reference frame is a backward reference frame of the current picture block and the second reference frame is a forward reference frame of the current picture block, or in a case in which the first reference frame and the second reference frame each are a forward reference frame of the current picture block, or in a case in which the first reference frame and the second reference frame each are a backward reference frame of the current picture block, determine a second MVD in the second motion information according to Formula mvd_lY=−mvd_lX, where mvd_lY represents the second MVD, and mvd_lX represents the first MVD, and determine a second motion vector based on the second predicted motion vector and the second MVD, where the second motion vector is a motion vector of the current picture block in the second direction.

Optionally, in another possible implementation of this application, the determining unit is specifically configured to determine a second MVD in the second motion information according to Formula mvd_lY=−mvd_lX, where in this formula, mvd_lY represents the second MVD, and mvd_lX represents a first MVD, and determine a second motion vector based on a second predicted motion vector and the second MVD, where the second motion vector is a motion vector of the current picture block in the second direction.

Optionally, in another possible implementation of this application, the obtaining unit is specifically configured to calculate a first sequence number based on a sequence number of a current frame and the sequence number of the first reference frame according to Formula POC_listY0=2*POC_Cur−POC_listX, where POC_Cur represents the sequence number of the current frame, POC_listX represents the sequence number of the first reference frame, and POC_listY0 represents the first sequence number, and when the second reference frame list includes the first sequence number, determine, as the index value of the second reference frame, a number of a reference frame represented by the first sequence number in the second reference frame list.

Optionally, in another possible implementation of this application, the obtaining unit is specifically configured to calculate a second sequence number based on a sequence number of a current frame and the sequence number of the first reference frame according to Formula (POC_Cur−POC_listX)*(POC_listY0'−POC_Cur)>0, where POC_listY0' represents the second sequence number, and when the second reference frame list includes the second sequence number, determine, as the index value of the second reference frame, a number of a reference frame represented by the second sequence number in the second reference frame list.

Optionally, in another possible implementation of this application, the obtaining unit is specifically configured to calculate a third sequence number based on a sequence number of a current frame and the sequence number of the first reference frame according to Formula POC_listX≠POC_listY0", where POC_listY0" represents the third sequence number, and determine, as the index value of the second reference frame, a number of a reference frame represented by the third sequence number in the second reference frame list.

According to a third aspect, a bidirectional inter prediction method is provided. There are a plurality of implementations for the bidirectional inter prediction method.

An implementation is parsing a bitstream to obtain a first identifier, where the first identifier is used to indicate whether to determine second motion information based on first motion information, the first motion information is motion information of a current picture block in a first direction, and the second motion information is motion information of the current picture block in a second direction, if a value of the first identifier is a first preset value, obtaining the first motion information, and determining the second motion information based on the first motion information, and determining a prediction sample of the current picture block based on the first motion information and the second motion information.

Another implementation is parsing a bitstream to obtain a second identifier, where the second identifier is used to indicate whether to calculate motion information of a current picture block according to a motion information derivation algorithm, if a value of the second identifier is a second preset value, obtaining a third identifier, where the third identifier is used to indicate whether to determine second motion information based on first motion information, the first motion information is motion information of the current picture block in a first direction, and the second motion information is motion information of the current picture block in a second direction, if a value of the third identifier is a third preset value, obtaining the first motion information, and determining the second motion information based on the first motion information, and determining a prediction sample of the current picture block based on the first motion information and the second operation information.

Another implementation is parsing a bitstream to obtain a second identifier, where the second identifier is used to indicate whether to calculate motion information of a current picture block according to a motion information derivation algorithm, if a value of the second identifier is a second preset value, obtaining first motion information, and determining second motion information based on the first motion information, where the first motion information is motion information of the current picture block in a first direction, and the second motion information is motion information of the current picture block in a second direction, and determining a prediction sample of the current picture block based on the first motion information and the second motion information.

Another implementation is parsing a bitstream to obtain a fourth identifier, where the fourth identifier is used to indicate whether to calculate motion information of a current picture block according to a motion information derivation algorithm, if a value of the fourth identifier is a fourth preset value, determining an index value of a first reference frame and an index value of a second reference frame based on a first reference frame list and a second reference frame list, where the first reference frame list is a reference frame list of the current picture block in a first direction, the second reference frame list is a reference frame list of the current picture block in a second direction, the first reference frame is a reference frame of the current picture block in the first direction, and the second reference frame is a reference frame of the current picture block in the second direction, obtaining a first MVD and a first MVP identifier, and determining second motion information based on first motion information, where the first motion information includes the index value of the first reference frame, the first MVD, and the first MVP identifier, and the second motion information is motion information of the current picture block in the second direction, and determining a prediction sample of the current picture block based on the first motion information and the second motion information.

Another implementation is parsing a bitstream to obtain a first identifier, where the first identifier is used to indicate whether to determine second motion information based on first motion information, the first motion information is motion information of a current picture block in a first direction, and the second motion information is motion information of the current picture block in a second direction, if a value of the first identifier is an eighth preset value, obtaining a fifth identifier, where the fifth identifier is used to indicate whether to determine the first motion information based on the second motion information, if a value of the fifth identifier is a fifth preset value, obtaining the second motion information, and determining the first motion information based on the second motion information, and determining a prediction sample of the current picture block based on the first motion information and the second motion information.

Another implementation is parsing a bitstream to obtain a second identifier, where the second identifier is used to indicate whether to calculate motion information of a current picture block according to a motion information derivation algorithm, if a value of the second identifier is a second preset value, obtaining a third identifier, where the third identifier is used to indicate whether to determine second motion information based on first motion information, the first motion information is motion information of the current picture block in a first direction, and the second motion information is motion information of the current picture block in a second direction, if a value of the third identifier is a sixth preset value, obtaining the second motion information, and determining the first motion information based on the second motion information, and determining a prediction sample of the current picture block based on the first motion information and the second operation information.

For specific descriptions of the first identifier to the fourth identifier, refer to the following descriptions.

In the bidirectional inter prediction method provided in this application, after an identifier is obtained by parsing the bitstream, whether to determine the second motion information based on the first motion information is determined based on a value of the identifier. After it is determined that the second motion information needs to be determined based on the first motion information, the first motion information is obtained, and then the second motion information is determined based on the obtained first motion information. In this way, the bitstream needs to include only the corresponding identifier and the first motion information, and no longer needs to include the second motion information. In comparison with a conventional technology in which a bitstream includes motion information of each picture block in each direction, the bidirectional inter prediction method provided in this application effectively reduces motion information included in the bitstream, and improves effective utilization of transmission resources, a transmission rate, and a coding rate.

According to a fourth aspect, a bidirectional inter prediction apparatus is provided. The bidirectional inter prediction apparatus includes an obtaining unit and a determining unit.

Specifically, in an implementation, the obtaining unit is configured to parse a bitstream to obtain a first identifier, where the first identifier is used to indicate whether to determine second motion information based on first motion information, the first motion information is motion information of a current picture block in a first direction, and the second motion information is motion information of the current picture block in a second direction, and if a value of the first identifier is a first preset value, obtain the first motion information. The determining unit is configured to determine the second motion information based on the first motion information obtained by the obtaining unit, and determine a prediction sample of the current picture block based on the first motion information and the second motion information.

In another implementation, the obtaining unit is configured to parse a bitstream to obtain a second identifier, where the second identifier is used to indicate whether to calculate motion information of a current picture block according to a motion information derivation algorithm, if a value of the second identifier is a second preset value, obtain a third identifier, where the third identifier is used to indicate whether to determine second motion information based on first motion information, the first motion information is motion information of the current picture block in a first direction, and the second motion information is motion information of the current picture block in a second direction, and if a value of the third identifier is a third preset value, obtain the first motion information. The determining unit is configured to determine the second motion information based on the first motion information obtained by the obtaining unit, and determine a prediction sample of the current picture block based on the first motion information and the second motion information.

In another implementation, the obtaining unit is configured to parse a bitstream to obtain a second identifier, where the second identifier is used to indicate whether to calculate motion information of a current picture block according to a motion information derivation algorithm, and if a value of the second identifier is a second preset value, obtain first motion information. The determining unit is configured to determine second motion information based on the first motion information obtained by the obtaining unit, where the first motion information is motion information of the current picture block in a first direction, and the second motion information is motion information of the current picture block in a second direction, and determine a prediction sample of the current picture block based on the first motion information and the second motion information.

In another implementation, the obtaining unit is configured to parse a bitstream to obtain a fourth identifier, where the fourth identifier is used to indicate whether to calculate motion information of a current picture block according to a motion information derivation algorithm. The determining unit is configured to, if a value of the fourth identifier obtained by the obtaining unit is a fourth preset value, determine an index value of a first reference frame and an index value of a second reference frame based on a first reference frame list and a second reference frame list, where the first reference frame list is a reference frame list of the current picture block in a first direction, the second reference frame list is a reference frame list of the current picture block in a second direction, the first reference frame is a reference frame of the current picture block in the first direction, and the second reference frame is a reference frame of the current picture block in the second direction. The obtaining unit is further configured to obtain a first MVD and a first MVP identifier. The determining unit is further configured to determine second motion information based on first motion information, where the first motion information includes the index value of the first reference frame, the first MVD, and the first MVP identifier, and the second motion information is motion information of the current picture block in the second direction, and determine a prediction sample of the current picture block based on the first motion information and the second motion information.

According to a fifth aspect, a terminal is provided. The terminal includes one or more processors, a memory, and a communications interface. The memory and the communications interface are coupled to the one or more processors. The memory is configured to store computer program code. The computer program code includes an instruction. When the one or more processors execute the instruction, the terminal performs the bidirectional inter prediction method according to any one of the first aspect or the possible implementations of the first aspect, or performs the bidirectional inter prediction method according to any one of the third aspect or the possible implementations of the third aspect.

According to a sixth aspect, a video decoder is provided, including a non-volatile storage medium and a central processing unit (CPU). The non-volatile storage medium stores an executable program. The CPU is connected to the non-volatile storage medium, and executes the executable program to implement the bidirectional inter prediction method according to any one of the first aspect or the possible implementations of the first aspect, or the bidirectional inter prediction method according to any one of the third aspect or the possible implementations of the third aspect.

According to a seventh aspect, a decoder is provided. The decoder includes the bidirectional inter prediction apparatus in the second aspect and a reconstruction module, where the reconstruction module is configured to determine a reconstructed sample value of a current picture block based on a prediction sample obtained by the bidirectional inter prediction apparatus, or the decoder includes the bidirectional inter prediction apparatus in the fourth aspect and a reconstruction module, where the reconstruction module is configured to determine a reconstructed sample value of a current picture block based on a prediction sample obtained by the bidirectional inter prediction apparatus.

According to an eighth aspect, a computer-readable storage medium is provided. The computer-readable storage medium stores an instruction. When the instruction is run on the terminal in the fifth aspect, the terminal is enabled to perform the bidirectional inter prediction method according to any one of the first aspect or the possible implementations of the first aspect, or perform the bidirectional inter prediction method according to any one of the third aspect or the possible implementations of the third aspect.

According to a ninth aspect, a computer program product including an instruction is provided. When the computer program product runs on the terminal in the fifth aspect, the terminal is enabled to perform the bidirectional inter prediction method according to any one of the first aspect or the possible implementations of the first aspect, or perform the bidirectional inter prediction method according to any one of the third aspect or the possible implementations of the third aspect.

According to a tenth aspect, the present disclosure further provides the method, the apparatus, the terminal, the storage medium, and the codec according to the first aspect to the ninth aspect and the possible implementations of the first aspect to the ninth aspect.

In this application, a name of the bidirectional inter prediction apparatus does not pose any limitation on devices or functional modules. In actual implementation, the devices or the functional modules may be named differently. Provided that functions of the devices or the functional modules are similar to those in this application, the devices or the functional modules fall within the scope of the claims in this application and their equivalent technologies.

For specific descriptions of the fifth aspect to the ninth aspect and implementations of the fifth aspect to the ninth aspect in this application, refer to the detailed descriptions of the first aspect and the implementations of the first aspect or the detailed descriptions of the third aspect and the implementations of the third aspect. In addition, for beneficial effects of the fifth aspect to the ninth aspect and the implementations of the fifth aspect to the ninth aspect, refer to the beneficial effects of the first aspect and the implementations of the first aspect or the beneficial effects of the third aspect and the implementations of the third aspect. Details are not described herein again.

These aspects or other aspects in this application are more concise and comprehensible in the following descriptions.

DESCRIPTION OF EMBODIMENTS

Figure 1:
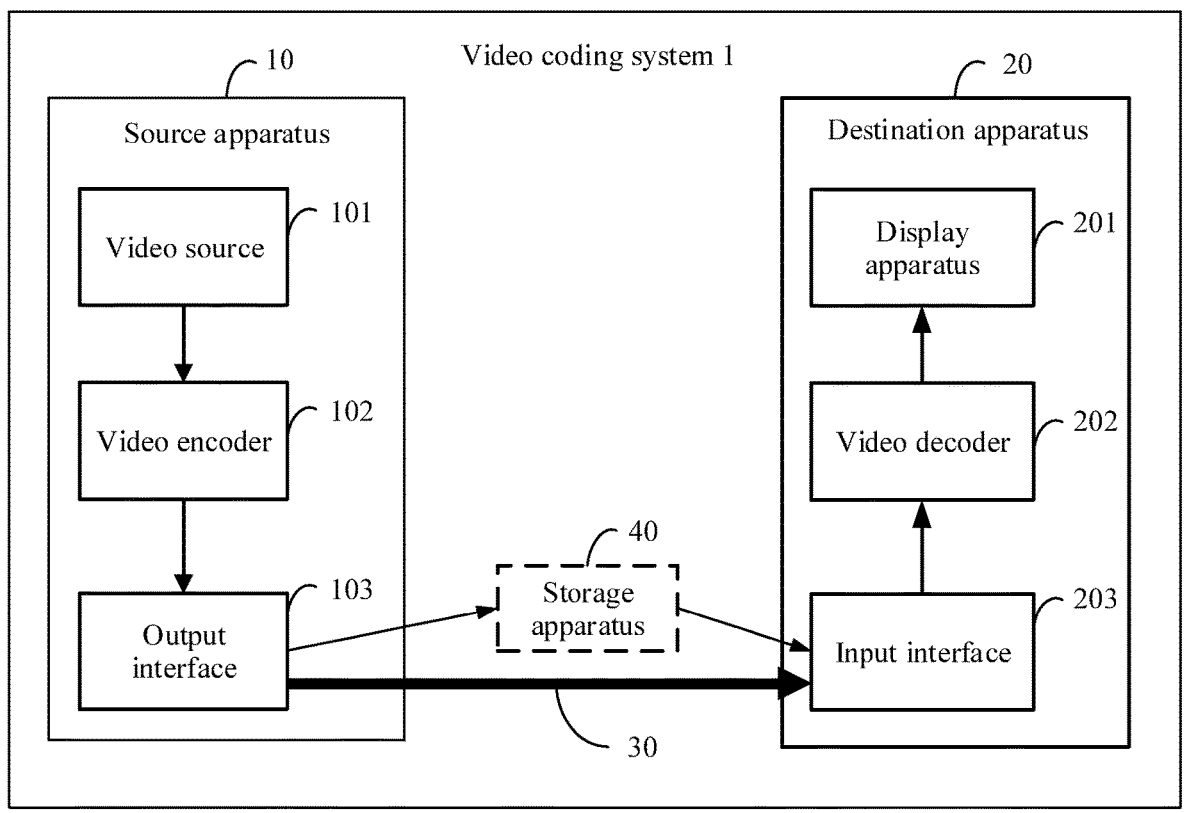
FIG. 1 is a schematic structural diagram of a video coding system according to an embodiment of this application.

In the specification, claims, and accompanying drawings of this application, terms such as "first", "second", "third", and "fourth" are intended to distinguish between different objects but do not indicate a particular order.

In the embodiments of this application, the words such as "example" or "for example" are used to represent giving an example, an illustration, or a description. Any embodiment or design scheme described as "example" or "for example" in the embodiments of this application should not be explained as being more preferred or having more advantages than another embodiment or design scheme. Exactly, use of the word such as "example" or "for example" is intended to present a related concept in a specific manner.

To facilitate understanding of the embodiments of this application, related concepts in the embodiments of this application are first described herein.

Picture encoding (image encoding) is a process of compressing a picture sequence into a bitstream.

Picture decoding (image decoding) is a process of restoring a bitstream to a reconstructed picture according to a specific syntax rule and a specific processing method.

Currently, a video picture encoding process is as follows. An encoder side first partitions an original picture into a plurality of parts that do not overlap, where each part may be used as a picture block. Then, the encoder side performs operations such as prediction, transform, and quantization on each picture block, to obtain a bitstream corresponding to the picture block. The prediction is to obtain a prediction block of the picture block, so that only a difference (or referred to as a residual or a residual block) between the picture block and the prediction block of the picture block may be encoded and transmitted, thereby reducing transmission overheads. Finally, the encoder side sends the bitstream corresponding to the picture block to a decoder side.

Correspondingly, after receiving the bitstream, the decoder side performs a video decoding process. Specifically, the decoder side performs operations such as prediction, inverse quantization, and inverse transform on the received bitstream to obtain a reconstructed picture block (or referred to as a picture block after reconstruction). This process is referred to as a picture reconstruction process (or a picture rebuilding process). Then, the decoder side assembles reconstructed blocks of all picture blocks in the original picture to obtain a reconstructed picture of the original picture, and plays the reconstructed picture.

An existing video picture coding technology includes intra prediction and inter prediction. Inter prediction is prediction performed by encoding picture block/decoding picture block by using a correlation between a current frame and a reference frame of the current frame. The current frame may have one or more reference frames. Specifically, a prediction picture block of a current picture block is generated based on a sample in a reference frame of the current picture block.

Usually, the prediction picture block of the current picture block may be generated based on only one reference picture block, or the prediction picture block of the current picture block may be generated based on at least two reference picture blocks. Generating the prediction picture block of the current picture block based on one reference picture block is referred to as unidirectional prediction, and generating the prediction picture block of the current picture block based on at least two reference picture blocks is referred to as bidirectional inter prediction. The at least two reference picture blocks in bidirectional inter prediction may be from a same reference frame or different reference frames. In other words, a "direction" in this application is a generalized definition. One direction in this application corresponds to one reference picture block. The following first direction and second direction correspond to different reference picture blocks. The two reference picture blocks may be included in a forward reference frame/backward reference frame of the current picture block, or one reference picture block may be included in a forward reference frame of the current picture block, and the other reference picture block may be included in a backward reference frame of the current picture block.

Optionally, bidirectional inter prediction may be inter prediction performed by using a correlation between a current video frame and a video frame that is encoded and played before the current video frame and a correlation between the current video frame and a video frame that is encoded before the current video frame and played after the current video frame.

It can be learned that bidirectional inter prediction includes inter prediction in two directions that is usually referred to as forward inter prediction and backward inter prediction. Forward inter prediction is inter prediction performed based on the correlation between the current video frame and the video frame that is encoded and played before the current video frame. Backward inter prediction is inter prediction performed based on the correlation between the current video frame and the video frame that is encoded before the current video frame and played after the current video frame.

Forward inter prediction corresponds to a forward reference frame list L0, and backward inter prediction corresponds to a backward reference frame list L1. The two reference frame lists may include a same quantity of reference frames or different quantities of reference frames.

Motion compensation (MC) is a process of predicting a current picture block based on a reference picture block.

In most coding frameworks, a video sequence includes a series of pictures (picture), a picture is partitioned into at least one slice, and each slice is further partitioned into picture blocks. Video encoding/decoding is performed by picture block. Encoding/decoding may be performed from left to right and from top to bottom row by row from the top-left location of the picture. Herein, the picture block may be a macro block (MB) in the video coding standard H.264, or may be a coding unit (CU) in the High Efficiency Video Coding (HEVC) standard. This is not specifically limited in the embodiments of this application.

In this application, a picture block that is being encoded/decoded is referred to as the current picture block (current block), and a picture in which the current picture block is located is referred to as a current frame.

Usually, the current frame may be a unidirectional prediction frame (P frame), or may be a bidirectional prediction frame (B frame). When the current frame is the P frame, the current frame has one reference frame list. When the current frame is the B frame, the current frame has two reference frame lists, and the two lists are usually referred to as L0 and L1. Each reference frame list includes at least one reconstructed frame that is used as a reference frame of the current frame. The reference frame is used to provide a reference sample for inter prediction on the current frame.

In the current frame, a neighboring picture block (for example, on the left, top, or right side of the current block) of the current picture block may have been encoded/decoded, and a reconstructed picture is obtained. The neighboring picture block is referred to as a reconstructed picture block. Information such as a coding mode and a reconstructed sample of the reconstructed picture block is available.

A frame that has been encoded/decoded before the current frame is encoded/decoded is referred to as a reconstructed frame.

A motion vector (MV) is an important parameter in an inter prediction process, and represents a spatial displacement of the encoded picture block relative to the current picture block. Usually, a motion estimation (ME) method, such as motion search, may be used to obtain a motion vector. In a preliminary inter prediction technology, an encoder side transmits a motion vector of a current picture block in a bitstream, so that a decoder side reproduces a prediction sample of the current picture block, to obtain a reconstructed block. To further improve encoding efficiency, it is further proposed to differentially encode a motion vector by using a reference motion vector, that is, encode only a MVD.

To enable the decoder side and the encoder side to use a same reference picture block, the encoder side needs to send motion information of each picture block to the decoder side through a bitstream. If the encoder side directly encodes a motion vector of each picture block, a large quantity of transmission resources are consumed. Because motion vectors of spatially neighboring picture blocks are strongly correlated, the motion vector of the current picture block can be predicted based on a motion vector of a neighboring encoded picture block. A motion vector obtained through prediction is referred to as an MVP, and a difference between the motion vector of the current picture block and the MVP is referred to as an MVD.

In the video coding standard H.264, multi-reference frame prediction is used in a ME process to improve prediction accuracy. To be specific, a buffer storing a plurality of reconstructed frames is created, and all the reconstructed frames in the buffer are searched for an optimal reference picture block for MC, to better remove temporal redundancy. In the video coding standard H.264, two buffers are used in inter prediction a reference frame list 0 (reference list 0) and a reference frame list 1 (reference list 1). A reference frame in which an optimal reference block in each list is located is marked by an index value, that is, ref_idx_l0 or ref_idx_l1. In each reference frame list, motion information of a reference picture block includes an index value (ref_idx_l0 or ref_idx_l1) of a reference frame, an MVP identifier, and an MVD. The decoder side may find a correct reference picture block in a selected reference frame based on the index value of the reference frame, the MVP identifier, and the MVD.

Currently, inter prediction modes frequently used in the HEVC standard are an advanced motion vector prediction (AMVP) mode, a merge mode, and a non-translational motion model prediction mode.

In the AMVP mode, the encoder side constructs a candidate motion vector list by using motion information of an encoded picture block that is spatially or temporally adjacent to the current picture block, and determines an optimal motion vector in the candidate motion vector list as the MVP of the current picture block based on rate-distortion costs. In addition, the encoder side performs motion search in a neighborhood centered on the MVP to obtain the motion vector of the current picture block. The encoder side transmits an index value (namely, the MVP identifier) of the MVP in the candidate motion vector list, the index value of the reference frame, and the MVD to the decoder side.

In the merge mode, the encoder side constructs a candidate motion information list by using motion information of an encoded picture block that is spatially or temporally adjacent to the current picture block, and determines optimal motion information in the candidate motion information list as motion information of the current picture block based on rate-distortion costs. The encoder side transmits an index value of a location of the optimal motion information in the candidate motion information list to the decoder side.

In the non-translational motion model prediction mode, the encoder side and the decoder side derive motion information of all subblocks of the current picture block by using a same motion model, and perform MC based on the motion information of all the subblocks to obtain a prediction picture block. This improves prediction efficiency. A motion model frequently used by the encoder side and the decoder side is a 4-parameter affine model, a 6-parameter affine transform model, or an 8-parameter bilinear model.

For example, the 4-parameter affine transform model may be represented by using motion vectors of two samples and coordinates of the two samples relative to the top-left sample of the current picture block. Herein, a sample used to represent a motion model parameter is referred to as a control point. If the top-left sample (0, 0) of the current picture block and the top-right sample (W, 0) of the current picture block are control points, and motion vectors of the top-left sample and the top-right sample of the current picture block are respectively $(vx_0, vy_0)$ and $(vx_1, vy_1)$, motion information of each subblock of the current picture block is obtained according to Formula (1). In Formula (1), (x, y) represents coordinates of the subblock relative to the top-left sample of the current picture block, (vx, vy) represents a motion vector of the subblock, and W represents the width of the current picture block.

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{W}y + vy_0 \end{cases} \quad (1)$$

For example, the 6-parameter affine transform model may be represented by using motion vectors of three samples and coordinates of the three samples relative to the top-left sample of the current picture block. If the top-left sample (0, 0) of the current picture block, the top-right sample (W, 0) of the current picture block and the bottom-left sample (0, H) of the current picture block are control points, and motion vectors of the top-left sample, the top-right sample, and the bottom-left sample of the current picture block are respectively $(vx_0, vy_0)$, $(vx_1, vy_1)$, and $(vx_2, vy_2)$, motion information of each subblock of the current picture block is obtained according to Formula (2). In Formula (2), (x, y) represents coordinates of the subblock relative to the top-left sample of the current picture block, (vx, vy) represents a motion vector of the subblock, and W and H respectively represent the width and the height of the current picture block.

$$\begin{cases} vx = \frac{vx_1 - vx_0}{W}x + \frac{vx_2 - vy_0}{H}y + vx_0 \\ vy = \frac{vy_1 - vy_0}{W}x + \frac{vy_2 - vx_0}{H}y + vy_0 \end{cases} \quad (2)$$

For example, the 8-parameter bilinear model may be represented by using motion vectors of four samples and coordinates of the four samples relative to the top-left sample of the current picture block. If the top-left sample (0, 0) of the current picture block, the top-right sample (W, 0) of the current picture block, the bottom-left sample (0, H) of the current picture block, and the bottom-right sample (W, H) of the current picture block are control points, and motion vectors of the top-left sample, the top-right sample, the bottom-left sample, and the bottom-right sample of the current picture block are respectively $(vx_0, vy_0)$, $(vx_1, vy_1)$, $(vx_2, vy_2)$, and $(vx_3, vy_3)$, motion information of each subblock of the current picture block is obtained according to Formula (3). In Formula (3), (x, y) represents coordinates of the subblock relative to the top-left sample of the current picture block, (vx, vy) represents a motion vector of the subblock, and W and H respectively represent the width and the height of the current picture block.

$$\begin{cases} v_x = \dfrac{v_{1x}-v_{0x}}{W}x + \dfrac{v_{2x}-v_{0x}}{H}y + \dfrac{v_{3x}+v_{0x}-v_{1x}-v_{2x}}{WH}xy + v_{0x} \\ v_y = \dfrac{v_{1y}-v_{0y}}{W}x + \dfrac{v_{2y}-v_{0y}}{H}y + \dfrac{v_{3y}+v_{0y}-v_{1y}-v_{2y}}{WH}xy + v_{0y} \end{cases} \quad (3)$$

It can be easily learned that, in any one of the foregoing inter prediction modes, if inter prediction is bidirectional inter prediction, the encoder side needs to send motion information of each picture block in each direction to the decoder side. Consequently, the motion information occupies a comparatively large quantity of transmission resources. This reduces effective utilization of transmission resources, a transmission rate, and coding compression efficiency.

To resolve the foregoing problem, this application provides a bidirectional inter prediction method. In bidirectional inter prediction, an encoder side sends motion information of a current picture block in a first direction to a decoder side, and after receiving the motion information of the current picture block in the first direction, the decoder side calculates motion information of the current picture block in a second direction based on the motion information of the current picture block in the first direction. In this way, a prediction sample of the current picture block may be calculated based on the motion information of the current picture block in the first direction and the motion information of the current picture block in the second direction.

The bidirectional inter prediction method provided in this application may be performed by a bidirectional inter prediction apparatus, a video coding apparatus, a video codec, or another device having a video coding function.

The bidirectional inter prediction method provided in this application is applicable to a video coding system. In the video coding system, a video encoder 100 and a video decoder 200 are configured to calculate motion information of a current picture block according to examples of the bidirectional inter prediction method provided in this application. Specifically, motion information of the current picture block in a second direction is calculated based on motion information of the current picture block in a first direction, so that a prediction sample of the current picture block is determined based on the motion information of the current picture block in the first direction and the motion information of the current picture block in the second direction. In this way, only the motion information of the current picture block in the first direction needs to be transmitted between the video encoder 10 and the video encoder 20. This effectively improves transmission resource utilization and coding compression efficiency.

FIG. 1 shows a structure of a video coding system. As shown in FIG. 1, the video coding system 1 includes a source apparatus 10 and a destination apparatus 20. The source apparatus 10 generates encoded video data. The source apparatus 10 may also be referred to as a video encoding apparatus or a video encoding device. The destination apparatus 20 may decode the encoded video data generated by the source apparatus 10. The destination apparatus 20 may also be referred to as a video decoding apparatus or a video decoding device. The source apparatus 10 and/or the destination apparatus 20 may include at least one processor and a memory coupled to the at least one processor. The memory may include but is not limited to a read-only memory (ROM), a random-access memory (RAM), an electrically erasable programmable read-only memory (EEPROM), a flash memory, or any other medium that may be configured to store required program code in a form of an instruction or a data structure that can be accessed by a computer. This is not specifically limited in this application.

The source apparatus 10 and the destination apparatus 20 may include various apparatuses, including a desktop computer, a mobile computing apparatus, a notebook (for example, laptop) computer, a tablet computer, a set-top box, a handheld telephone set such as a "smartphone", a television set, a camera, a display apparatus, a digital media player, a video game console, an in-vehicle computer, and a similar apparatus.

The destination apparatus 20 may receive the encoded video data from the source apparatus 10 through a link 30. The link 30 may include one or more media and/or apparatuses that can transfer the encoded video data from the source apparatus 10 to the destination apparatus 20. In an example, the link 30 may include one or more communications media that enable the source apparatus 10 to directly transmit the encoded video data to the destination apparatus 20 in real time. In this example, the source apparatus 10 may modulate the encoded video data according to a communications standard (for example, a wireless communications protocol), and may transmit the modulated video data to the destination apparatus 20. The one or more communications media may include a wireless and/or wired communications medium, for example, a radio frequency (RF) spectrum or one or more physical transmission lines. The one or more communications media may constitute a part of a packet-based network, and the packet-based network is, for example, a local area network, a wide area network, or a global network (for example, the Internet). The one or more communications media may include a router, a switch, a base station, or another device implementing communication from the source apparatus 10 to the destination apparatus 20.

In another example, the encoded video data may be output to a storage apparatus 40 through an output interface 103. Similarly, the encoded video data may be accessed from the storage apparatus 40 through an input interface 240. The storage apparatus 40 may include a plurality of types of locally accessible data storage media such as a BLU-RAY disc, a high-density digital video disc (DVD), a compact disc read-only memory (CD-ROM), a flash memory, or another suitable digital storage medium configured to store the encoded video data.

In another example, the storage apparatus 40 may correspond to a file server or another intermediate storage apparatus that stores the encoded video data generated by the source apparatus 10. In this example, the destination apparatus 20 may obtain the stored video data from the storage apparatus 40 through streaming transmission or downloading. The file server may be any type of server that can store the encoded video data and transmit the encoded video data to the destination apparatus 20. For example, the file server may include a world wide web (Web) server (for example, used for a website), a File Transfer Protocol (FTP) server, a network attached storage (NAS) apparatus, or a local disk drive.

The destination apparatus 20 may access the encoded video data through any standard data connection (for example, an Internet connection). An example type of the data connection includes a wireless channel, a wired connection (for example, a cable modulator/demodulator (modem)), or a combination thereof that is suitable for accessing the encoded video data stored on the file server. Transmission of the encoded video data from the file server may be streaming transmission, download transmission, or a combination thereof.

The bidirectional inter prediction method in this application is not limited to a wireless application scenario. For example, the bidirectional inter prediction method in this application may be used in video coding for supporting a plurality of multimedia applications such as the following applications over-the-air television broadcasting, cable television transmission, satellite television transmission, streaming video transmission (for example, through the Internet), encoding of video data stored in a data storage medium, decoding of video data stored in a data storage medium, or another application. In some examples, the video coding system 1 may be configured to support unidirectional or bidirectional video transmission, to support applications such as streaming video transmission, video playing, video broadcasting, and/or videotelephony.

It should be noted that the video coding system 1 shown in FIG. 1 is merely an example of the video coding system, and does not pose any limitation on the video coding system in this application. The bidirectional inter prediction method provided in this application is further applicable to a scenario in which there is no data communication between an encoding apparatus and a decoding apparatus. In other examples, to-be-encoded video data or the encoded video data may be retrieved from a local memory, may be transmitted in a streaming manner on a network, or the like. The video encoding apparatus may encode the to-be-encoded video data and store the encoded video data in the memory. The video decoding apparatus may obtain the encoded video data from the memory and decode the encoded video data.

In FIG. 1, the source apparatus 10 includes a video source 101, a video encoder 102, and the output interface 103. In some examples, the output interface 103 may include a modem and/or a transmitter. The video source 101 may include a video capturing apparatus (for example, a camera), a video archive including previously captured video data, a video input interface for receiving video data from a video content provider, and/or a computer graphics system for generating video data, or a combination of the foregoing video data sources.

The video encoder 102 may encode video data that is from the video source 101. In some examples, the source apparatus 10 directly transmits the encoded video data to the destination apparatus 20 through the output interface 103. In other examples, the encoded video data may alternatively be stored in the storage apparatus 40, so that the destination apparatus 20 subsequently accesses the encoded video data for decoding and/or playing.

In an example in FIG. 1, the destination apparatus 20 includes a display apparatus 201, a video decoder 202, and the input interface 203. In some examples, the input interface 203 includes a receiver and/or a modem. The input interface 203 may receive the encoded video data through the link 30 and/or from the storage apparatus 40. The display apparatus 201 may be integrated with the destination apparatus 20 or may be disposed outside the destination apparatus 20. Usually, the display apparatus 201 displays decoded video data. The display apparatus 201 may include a plurality of types of display apparatuses, for example, a liquid crystal display, a plasma display, an organic light-emitting diode display, or a display apparatus of another type.

Optionally, the video encoder 102 and the video decoder 202 may be respectively integrated with an audio encoder and an audio decoder, and may include an appropriate multiplexer-demultiplexer unit or other hardware and software, to encode both audio and a video in a combined data stream or a separate data stream.

The video encoder 102 and the video decoder 202 may include at least one microprocessor, a digital signal processor (DSP), an application-specific integrated circuit (ASIC), a field-programmable gate array (FPGA), discrete logic, hardware, or any combination thereof. If the bidirectional inter prediction method provided in this application is implemented by using software, an instruction used for the software may be stored in an appropriate non-volatile computer-readable storage medium, and at least one processor may be used to execute the instruction in the hardware to implement this application. Any one of the foregoing content (including the hardware, the software, a combination of the hardware and the software, and the like) may be considered as the at least one processor. The video encoder 102 may be included in an encoder, the video decoder 202 may be included in a decoder, and the encoder or the decoder may be a part of a combined encoder/decoder (codec) in a corresponding apparatus.

The video encoder 102 and the video decoder 202 in this application may perform operations according to a video compression standard (for example, HEVC), or may perform operations according to another industry standard. This is not specifically limited in this application.

The video encoder 102 is configured to perform bidirectional ME on a current picture block, to determine motion information of the current picture block in a first direction, and calculate motion information of the current picture block in a second direction based on the motion information of the current picture block in the first direction. In this way, the video encoder 102 determines a prediction picture block of the current picture block based on the motion information of the current picture block in the first direction and the motion information of the current picture block in the second direction. Further, the video encoder 102 performs operations such as transform and quantization on a residual between the current picture block and the prediction picture block of the current picture block to generate a bitstream, and sends the bitstream to the video decoder 202. The bitstream includes the motion information of the current picture block in the first direction and indication information that is used to indicate to determine the second motion information based on the first motion information. The indication information may be represented by using different identifiers. For a method for representing the indication information, refer to the following descriptions.

Optionally, a method for which "the video encoder 102 calculates motion information of the current picture block in a second direction based on the motion information of the current picture block in the first direction" may be as follows. The video encoder 102 determines a motion vector of the current picture block in the second direction based on a motion vector of the current picture block in the first direction, or the video encoder 102 determines a MVD of the current picture block in the second direction based on a MVD of the current picture block in the first direction, and determines a motion vector of the current picture block in the second direction based on the MVD of the current picture block in the second direction and a predicted motion vector of the current picture block in the second direction.

Figure 4:
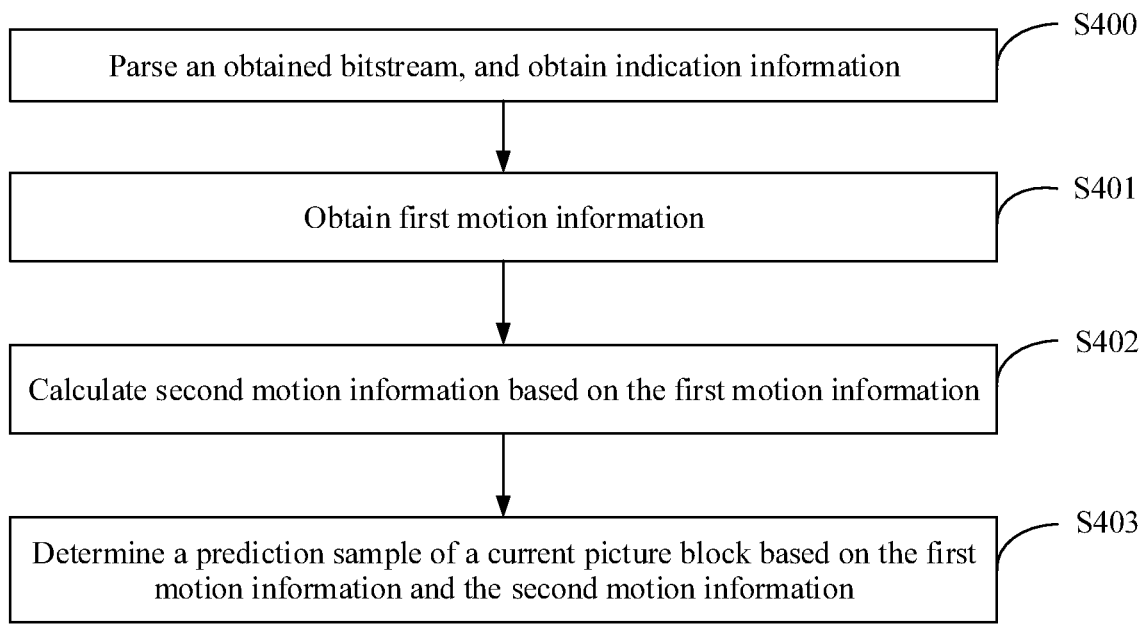
FIG. 4 is a schematic flowchart of a bidirectional inter prediction method according to an embodiment of this application.

Refer to the following FIG. 4. The video decoder 202 is configured to obtain a bitstream, and parse the bitstream to obtain indication information used to indicate to determine the second motion information based on the first motion information (S400), in other words, to determine to derive and calculate, based on motion information in a direction, motion information in another direction, where the first motion information is motion information of the current picture block in the first direction, the second motion information is motion information of the current picture block in the second direction, and the first direction and the second direction herein are different, obtain the first motion information (S401), determine the second motion information based on the obtained first motion information (S402), and determine a prediction sample of the current picture block based on the first motion information and the second motion information (S403).

A method for which "the video decoder 202 calculates motion information of the current picture block in a second direction based on the motion information of the current picture block in the first direction" may be as follows. The video decoder 202 determines a motion vector of the current picture block in the second direction based on a motion vector of the current picture block in the first direction, or the video decoder 202 determines a MVD of the current picture block in the second direction based on a MVD of the current picture block in the first direction, and determines a motion vector of the current picture block in the second direction based on the MVD of the current picture block in the second direction and a predicted motion vector of the current picture block in the second direction.

Figure 2:
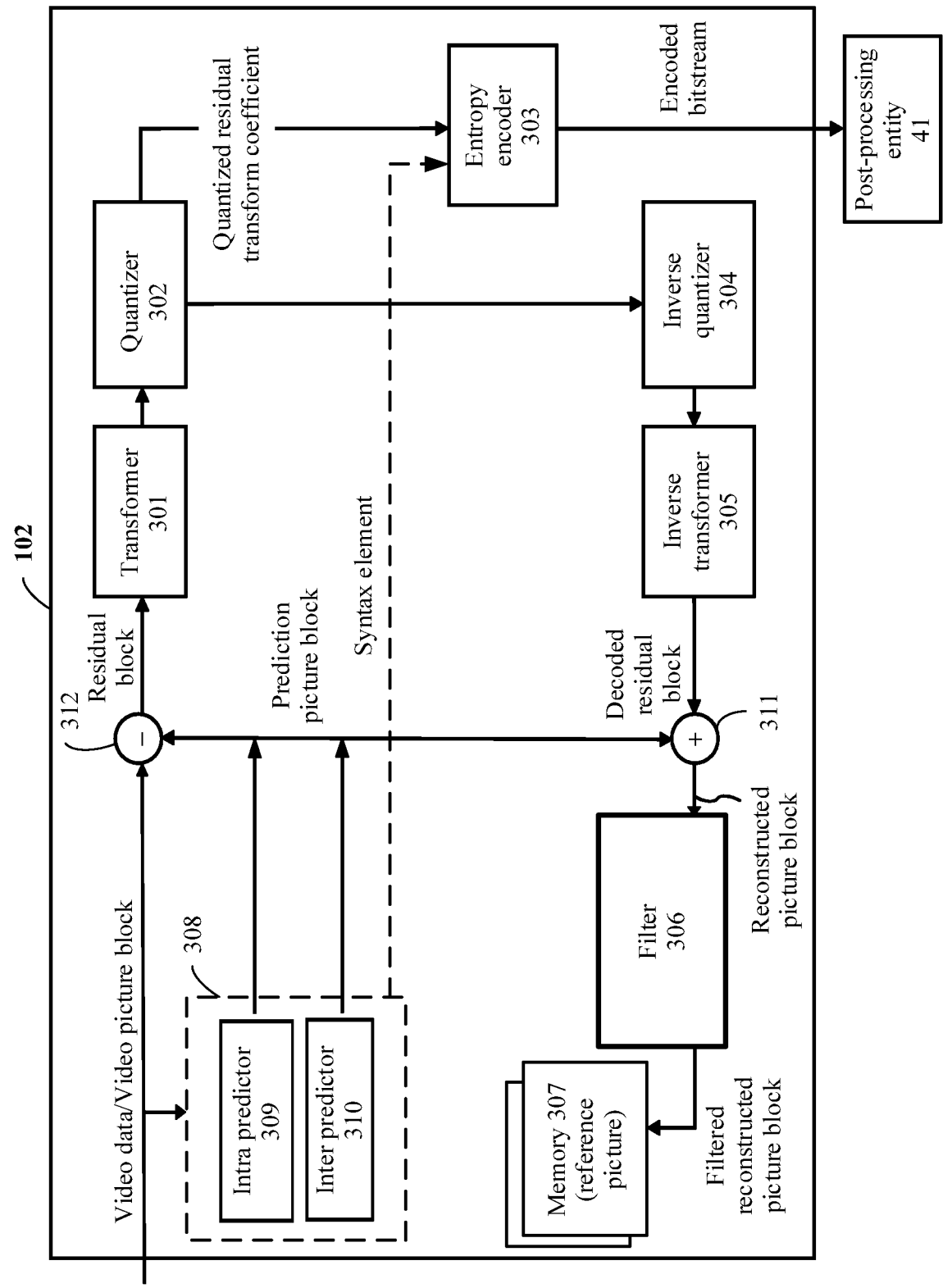
FIG. 2 is a schematic structural diagram of a video encoder according to an embodiment of this application.

FIG. 2 is a schematic structural diagram of the video encoder 102 according to an embodiment of this application. As shown in FIG. 2, the video encoder 102 is configured to output a video to a post-processing entity 41. The post-processing entity 41 is an example of a video entity capable of processing encoded video data that is from the video encoder 102, for example, a media aware network element (MANE) or a stitching apparatus/an editing apparatus. In some cases, the post-processing entity 41 may be an example of a network entity. In some video encoding systems, the post-processing entity 41 and the video encoder 102 may be components of separate apparatuses. In other cases, functions described with respect to the post-processing entity 41 may be performed by a same apparatus including the video encoder 100. In an example, the post-processing entity 41 is an example of the storage apparatus 40 in FIG. 1.

The video encoder 102 may derive and calculate the motion information of the current picture block in the second direction based on the motion information of the current picture block in the first direction, and further determine the prediction picture block of the current picture block based on the motion information of the current picture block in the first direction and the motion information of the current picture block in the second direction, to complete bidirectional inter predictive encoding.

As shown in FIG. 2, the video encoder 102 includes a transformer 301, a quantizer 302, an entropy encoder 303, a filter 306, a memory 307, a prediction processing unit 308, and a summator 312. The prediction processing unit 308 includes an intra predictor 309 and an inter predictor 310. To reconstruct a picture block, the video encoder 102 further includes an inverse quantizer 304, an inverse transformer 305, and a summator 311. The filter 306 is specified to represent one or more loop filters, for example, a deblocking filter, an adaptive loop filter (ALF), and a sample adaptive offset (SAO) filter.

The memory 307 may store video data encoded by a component of the video encoder 102. The video data stored in the memory 307 may be obtained from the video source 101. The memory 307 may be a reference picture memory that stores reference video data used by the video encoder 102 to encode the video data in an intra or inter coding mode. The memory 307 may be a dynamic random access memory (DRAM) including a synchronous DRAM (SDRAM), a magnetoresistive RAM (MRAM), a resistive RAM (RRAM), or a memory apparatus of another type.

The video encoder 102 receives video data and stores the video data in a video data memory. A partitioning unit partitions the video data into several picture blocks, and these picture blocks may be further partitioned into smaller blocks, for example, partitioned based on a quadtree structure or a binary-tree structure. The partitioning may further include partitioning into slices (slice), tiles (tile), or other larger units. The video encoder 102 is usually a component for encoding a picture block in a to-be-encoded video slice. The slice may be partitioned into a plurality of picture blocks (and may be partitioned into picture block sets that are referred to as tiles).

The intra predictor 309 in the prediction processing unit 308 may perform intra predictive encoding on a current picture block relative to one or more neighboring picture blocks that are in a same frame or slice as the current picture block, to remove spatial redundancy. The inter predictor 310 in the prediction processing unit 308 may perform inter predictive encoding on the current picture block relative to one or more prediction picture blocks in one or more reference pictures, to remove temporal redundancy.

The prediction processing unit 308 may provide obtained intra-coded and inter-coded picture blocks for the video encoder 310 to generate a residual block, and provide the residual block for the summator 312 to reconstruct an encoded block used as a reference image.

After the prediction processing unit 308 generates a prediction picture block of the current picture block through inter prediction and intra prediction, the video encoder 102 generates the residual picture block by subtracting the prediction picture block from the to-be-encoded current picture block. The summator 312 represents one or more components that perform this subtraction operation. Residual video data in the residual block may be included in one or more transform units (TUs), and applied to the transformer 301. The transformer 301 transforms the residual video data into a residual transform coefficient through transform such as discrete cosine transform (DCT) or conceptually similar transform. The transformer 301 may transform the residual video data from a sample value domain to a transform domain, for example, a frequency domain.

The transformer 301 may send the obtained transform coefficient to the quantizer 302. The quantizer 302 quantizes the transform coefficient to further reduce a bitrate. In some examples, the quantizer 302 may further scan a matrix including a quantized transform coefficient. Alternatively, the entropy encoder 303 may perform scanning.

After quantization, the entropy encoder 303 performs entropy encoding on the quantized transform coefficient. For example, the entropy encoder 303 may perform context-adaptive variable-length coding (CAVLC), context-adaptive binary arithmetic coding (context based adaptive binary arithmetic coding, CABAC), or another entropy coding method or technology. After the entropy encoder 303 performs entropy encoding, an encoded bitstream may be sent to the video decoder 202, or archived for subsequent sending or subsequent retrieval by the video decoder 202. The entropy encoder 303 may further perform entropy encoding on a syntax element of the to-be-encoded current picture block.

The inverse quantizer 304 and the inverse transformer 305 respectively perform inverse quantization and inverse transform, to reconstruct the residual block in a sample domain, for example, to be subsequently used as a reference block of the reference picture. The summator 311 adds a reconstructed residual block to the prediction picture block generated by the inter predictor 310 or the intra predictor 309, to generate a reconstructed picture block. A prediction picture block of a picture block can be obtained by performing processing (such as interpolation) on a reference picture block of the picture block.

It should be understood that other structural variations of the video encoder 102 may be configured to encode a video stream. For example, for some picture blocks or picture frames, the video encoder 102 may directly quantize a residual signal, and correspondingly, processing by the transformer 301 and the inverse transformer 305 is not required. Alternatively, for some picture blocks or picture frames, the video encoder 102 does not generate residual data, and correspondingly, processing by the transformer 301, the quantizer 302, the inverse quantizer 304, and the inverse transformer 305 is not required. Alternatively, the video encoder 102 may directly store the reconstructed picture block as the reference block without processing by the filter 306. Alternatively, the quantizer 302 and the inverse quantizer 304 in the video encoder 102 may be combined.

Figure 3:
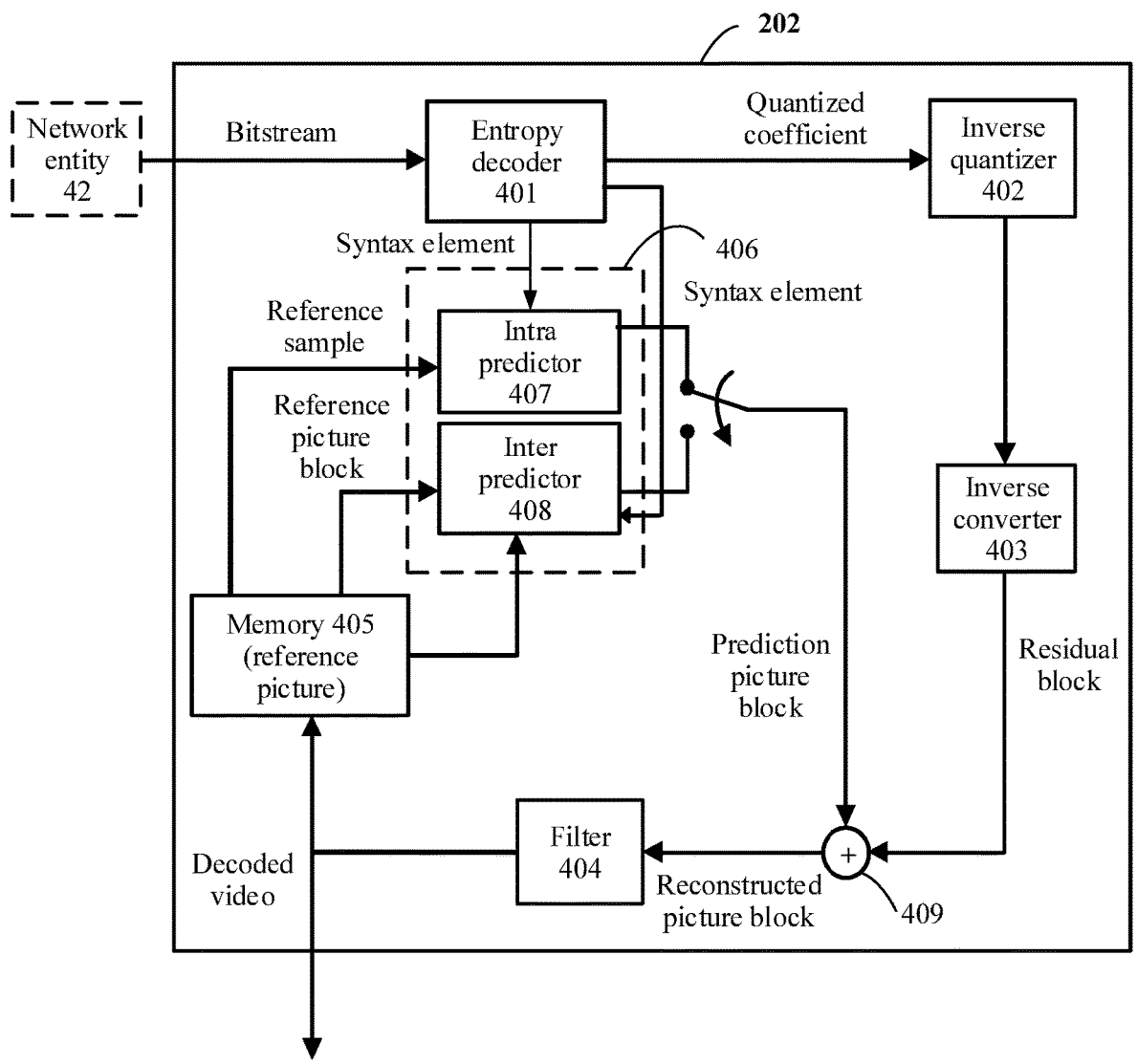
FIG. 3 is a schematic structural diagram of a video decoder according to an embodiment of this application.

FIG. 3 is a schematic structural diagram of the video decoder 202 according to an embodiment of this application. As shown in FIG. 3, the video decoder 202 includes an entropy decoder 401, an inverse quantizer 402, an inverse transformer 403, a filter 404, a memory 405, a prediction processing unit 406, and a summator 409. The prediction processing unit 406 includes an intra predictor 407 and an inter predictor 408. In some examples, the video decoder 202 may perform a decoding process that is roughly inverse to the encoding process described with respect to the video encoder 102 in FIG. 2.

In the decoding process, the video decoder 202 receives a bitstream from the video encoder 102. The video decoder 202 may receive video data from a network entity 42, and optionally, may further store the video data in a video data memory (not shown in the figure). The video data memory may store video data that is to be decoded by a component of the video decoder 202, for example, the encoded bitstream. The video data stored in the video data memory may be obtained from, for example, a local video source such as the storage apparatus 40 or a camera through wired or wireless network communication of the video data, or by accessing a physical data storage medium. Although the video data memory is not shown in FIG. 3, the video data memory and the memory 405 may be a same memory, or may be separately disposed memories. The video data memory and the memory 405 each may include any one of a plurality of types of memory apparatuses, for example, a DRAM including a SDRAM, a MRAM, a RRAM, or another type of memory apparatus. In various examples, the video data memory may be integrated onto a chip together with other components of the video decoder 200, or may be disposed outside the chip relative to those components.

The network entity 42 may be, for example, a server, a MANE, a video editor/clipper, or another apparatus configured to implement one or more of the technologies described above. The network entity 42 may include or may not include a video encoder, for example, the video encoder 102. Before the network entity 42 sends the bitstream to the video decoder 202, the network entity 42 may implement a part of the technologies described in this application. In some video decoding systems, the network entity 42 and the video decoder 202 may be components of separate apparatuses. In other cases, functions described with respect to the network entity 42 may be performed by a same apparatus including the video decoder 202. In some cases, the network entity 42 may be an example of the storage apparatus 40 in FIG. 1.

The entropy decoder 401 of the video decoder 202 performs entropy decoding on the bitstream to generate a quantized coefficient and some syntax elements. The entropy decoder 401 forwards the syntax elements to the filter 404. The video decoder 202 may receive syntax elements/a syntax element at a video slice level and/or a picture block level. In this application, in an example, the syntax element herein may include the indication information related to the current picture block, and the indication information is used to indicate to determine the second motion information based on the first motion information. In addition, in some examples, the video encoder 102 may send a signal to notify a specific syntax element indicating whether to determine the second motion information based on the first motion information.

The inverse quantizer 402 performs inverse quantization on, that is, dequantizes, a quantized transform coefficient provided in the bitstream and decoded by the entropy decoder 401. An inverse quantization process may include determining a to-be-applied quantization degree by using a quantization parameter calculated by the video encoder 102 for each picture block in a video slice, and similarly determining a to-be-applied inverse quantization degree. The inverse transformer 403 applies inverse transform, for example, inverse DCT, inverse integer transform, or a conceptually similar inverse transform process, to the transform coefficient, to generate a residual block in a sample domain.

After the prediction processing unit 406 generates a prediction picture block for the current picture block or a subblock of the current picture block, the video decoder 202 summates the residual block from the inverse transformer 403 and the corresponding prediction picture block generated by the prediction processing unit 406, to obtain a reconstructed block, that is, a decoded picture block. The summator 409 (which is also referred to as a reconstructor 409) represents a component that performs this summation operation. When necessary, a filter (in or after a decoding loop) may be further used to smoothen samples, or video quality may be improved in another manner. The filter 404 may be one or more loop filters, for example, a deblocking filter, an ALF, and a SAO filter.

It should be understood that other structural variations of the video decoder 202 may be configured to decode the bitstream. For example, for some picture blocks or picture frames, the entropy decoder 401 of the video decoder 202 does not obtain the quantized coefficient through decoding, and correspondingly, processing by the inverse quantizer 402 and the inverse transformer 403 is not required. For example, the inverse quantizer 402 and the inverse transformer 403 in the video decoder 202 may be combined.

With reference to the video coding system 1 shown in FIG. 1, the video encoder 102 shown in FIG. 2, and the video decoder 202 shown in FIG. 3, the following describes in detail the bidirectional inter prediction method provided in this application.

FIG. 4 is a schematic flowchart of a bidirectional inter prediction method according to an embodiment of this application. The method shown in FIG. 4 is performed by a bidirectional inter prediction apparatus. The bidirectional inter prediction apparatus may be the video decoder 202 in FIG. 1. FIG. 4 is described by using an example in which the bidirectional inter prediction apparatus is the video decoder 202.

As shown in FIG. 4, the bidirectional inter prediction method in this embodiment of this application may include the following steps.

S400. The video decoder 202 parses an obtained bitstream, and obtains indication information.

Optionally, the video decoder 202 parses the bitstream, and determines, based on a value of a syntax element in the bitstream, an inter prediction mode used to perform inter prediction on a current picture block in a current frame. The video decoder 202 obtains the indication information when the inter prediction mode is a bidirectional inter prediction mode.

The video decoder 202 may receive the encoded bitstream sent by the video encoder 102, or may obtain the encoded bitstream from the storage apparatus 40.

Optionally, the video decoder 202 in this embodiment of this application determines, based on a value of a syntax element inter_pred_idc, the inter prediction mode used to perform inter prediction on the current picture block in the current frame. It can be learned from the foregoing description that inter prediction includes unidirectional inter prediction and bidirectional inter prediction. Optionally, when the value of the syntax element inter_pred_idc is 0, the video decoder 202 determines that the inter prediction mode used to perform inter prediction on the current picture block in the current frame is forward inter prediction, when the value of the syntax element inter_pred_idc is 1, the video decoder 202 determines that the inter prediction mode used to perform inter prediction on the current picture block in the current frame is backward inter prediction, and when the value of the syntax element inter_pred_idc is 2, the video decoder 202 determines that the inter prediction mode used to perform inter prediction on the current picture block in the current frame is bidirectional inter prediction.

Optionally, after determining that the value of the syntax element inter_pred_idc is 2, the video decoder 202 obtains indication information used to indicate to determine second motion information based on first motion information. The first motion information is motion information of the current picture block in a first direction, the second motion information is motion information of the current picture block in a second direction, and the first direction is different from the second direction.

A picture block in this application may be a basic unit for performing video encoding or video decoding, for example, a CU, or may be a basic unit for performing a prediction operation, for example, a prediction unit (PU). This is not specifically limited in this embodiment of this application.

If the picture block is the basic unit for performing video encoding or video decoding, the current picture block in this embodiment of this application includes at least one subblock. Correspondingly, the first motion information includes motion information of each of the at least one subblock in the current picture block in the first direction, the second motion information includes motion information of each of the at least one subblock in the current picture block in the second direction, and the indication information is used to indicate to determine motion information of a subblock in the second direction based on motion information of the subblock in the first direction.

The video decoder 202 may obtain the indication information in a plurality of manners.

In a first implementation, the video decoder 202 parses a first identifier. When a value of the first identifier is a first preset value, the video decoder 202 determines to parse the first motion information, and determines the second motion information based on the first motion information. In other words, the video decoder 202 obtains the indication information. When a value of the first identifier is an eighth preset value, the video decoder 202 parses the bitstream to obtain a fifth identifier. When a value of the fifth identifier is a fifth preset value, the video decoder 202 determines to parse the second motion information, and calculates the first motion information based on the second motion information. When a value of the fifth identifier is a ninth preset value, the video decoder 202 obtains the first motion information and the second motion information. The first preset value and the fifth preset value may be the same, or may be different. This is not specifically limited in this embodiment of this application.

For example, the first identifier is mv_derived_flag_l0, the fifth identifier is mv_derived_flag_l1, both the first preset value and the fifth preset value are 1, and both the eighth preset value and the ninth preset value are 0. The video decoder 202 first parses mv_derived_flag_l0. When a value of mv_derived_flag_l0 is 1, the video decoder 202 parses the first motion information, and determines the second motion information based on the first motion information. When a value of mv_derived_flag_l0 is 0, the video decoder 202 parses mv_derived_flag_l1. When a value of mv_derived_flag_l1 is 1, the video decoder 202 parses the second motion information, and calculates the first motion information based on the second motion information. When both a value of mv_derived_flag_l0 and a value of mv_derived_flag_l1 are 0, the video decoder 202 parses the first motion information and the second motion information.

In a second implementation, the video decoder 202 parses a second identifier. When a value of the second identifier is a second preset value, the video decoder 202 determines to calculate motion information of the current picture block according to a motion information derivation algorithm. Then, the video decoder 202 parses a third identifier. When a value of the third identifier is a third preset value, the video decoder 202 determines to parse the first motion information, and determines the second motion information based on the first motion information. In other words, the video decoder 202 obtains the indication information. When a value of the third identifier is a sixth preset value, the video decoder 202 determines to parse the second motion information, and calculates the first motion information based on the second motion information.

For example, the second identifier is derived_mv_flag, the third identifier is derived_mv_direction, the third preset value is 1, and the sixth preset value is 0. The video decoder 202 first parses derived_mv_flag. When a value of derived_mv_flag is 1, the video decoder 202 determines to calculate the motion information of the current picture block according to the motion information derivation algorithm. When a value of derived_mv_flag is 0, the video decoder 202 parses the first motion information and the second motion information. When a value of derived_mv_direction is 1, the video decoder 202 parses the first motion information, and determines the second motion information based on the first motion information. When a value of derived_mv_direction is 0, the video decoder 202 determines to parse the second motion information, and calculates the first motion information based on the second motion information.

In a third implementation, the video decoder 202 parses a second identifier. When a value of the second identifier is a second preset value, the video decoder 202 determines to calculate motion information of the current picture block according to a motion information derivation algorithm. Then, the video decoder 202 determines, based on a preset derivation direction, to parse the first motion information, and determines the second motion information based on the first motion information. In other words, the video decoder 202 obtains the indication information. In other words, in this implementation, "determining the second motion information based on the first motion information" is preset. When a value of the second identifier is a seventh preset value, the video decoder 202 parses the first motion information and the second motion information.

For example, the second identifier is derived_mv_flag, the second preset value is 1, and the seventh preset value is 0. The video decoder 202 parses derived_mv_flag. When a value of derived_mv_flag is 1, the video decoder 202 determines to calculate the motion information of the current picture block according to the motion information derivation algorithm. Further, the video decoder 202 determines to parse the first motion information, and determines the second motion information based on the first motion information. When a value of derived_mv_flag is 0, the video decoder 202 parses the first motion information and the second motion information.

In a fourth implementation, the video decoder 202 parses a fourth identifier (for example, mv_derived_flag_l0). When a value of the fourth identifier is a fourth preset value, the video decoder 202 determines to calculate motion information of the current picture block according to a motion information derivation algorithm, and calculates a variable derived_ref_num based on a first reference frame list and a second reference frame list. The variable represents a quantity of mirrored/linear reference frame combinations that can be formed based on a first reference frame and a second reference frame. When the quantity of reference frame combinations is 1, the video decoder 202 directly determines index values of reference frames. Then, the video decoder 202 determines, based on a preset derivation direction, to parse the first motion information, and determines the second motion information based on the first motion information. In other words, the video decoder 202 obtains the indication information. The first reference frame list is a reference frame list of the current picture block in the first direction, the second reference frame list is a reference frame list of the current picture block in the second direction, the first reference frame is a reference frame of the current picture block in the first direction, and the second reference frame is a reference frame of the current picture block in the second direction. An index value of a reference frame in this embodiment of this application is a number of the reference frame in a corresponding reference frame list.

For example, a sequence number of the current frame is 4, the first reference frame list is [2, 0], and the second reference frame list is {6, 7}. Based on a condition B or condition C, it is determined that a reference frame whose sequence number is 2 in the first reference frame list and a reference frame whose sequence number is 6 in the second reference frame list can constitute a reference frame combination. In this case, both an index value of the first reference frame and an index value of the second reference frame are 0.

If a sequence number of the current frame is 4, the first reference frame list is {2, 0}, and the second reference frame list is {6, 7}, based on a condition B or condition C, it is determined that a reference frame whose sequence number is 2 in the first reference frame list and a reference frame whose sequence number is 6 in the second reference frame list can constitute a reference frame combination, and that a reference frame whose sequence number is 0 in the first reference frame list and a reference frame whose sequence number is 8 in the second reference frame list can also constitute a reference frame combination. In this case, the video decoder 202 needs to parse index values of reference frames.

Further, when determining that the inter prediction mode is the bidirectional inter prediction mode, the video decoder 202 may further determine whether feature information of the current frame satisfies a preset condition. In this case, when the feature information of the current frame satisfies the preset condition, the video decoder 202 obtains the indication information. In other words, a specific process of S401 may be as follows. The video decoder 202 obtains the indication information when determining that the inter prediction mode is the bidirectional inter prediction mode and the feature information of the current frame satisfies a first preset condition.

The feature information of the current frame includes at least one of a sequence number, a temporal level identifier (TID), and a quantity of reference frames. The bitstream obtained by the video decoder 202 includes a sequence parameter set (SPS), a picture parameter set (PPS), a slice header or a slice segment header, and encoded picture data. Then, the video decoder 202 parses the bitstream to obtain the feature information of the current frame.

The preset condition includes at least one of the following conditions.

Condition A. The current picture block has at least two reference frames.

Condition B. The sequence number of the current frame, a sequence number of the first reference frame, and a sequence number of the second reference frame satisfy the following formula:

POC_Cur−POC_listX=POC_listY−POC_Cur.

POC_Cur represents the sequence number of the current frame, POC_listX represents the sequence number of the first reference frame, POC_listY represents the sequence number of the second reference frame, the first reference frame is a reference frame of the current picture block in the first direction, and the second reference frame is a reference frame of the current picture block in the second direction.

Condition C. The sequence number of the current frame, a sequence number of the first reference frame, and a sequence number of the second reference frame satisfy the following formula:

(POC_Cur−POC_listX)*(POC_listY−POC_Cur)>0.

POC_Cur represents the sequence number of the current frame, POC_listX represents the sequence number of the first reference frame, POC_listY represents the sequence number of the second reference frame, the first reference frame is a reference frame of the current picture block in the first direction, and the second reference frame is a reference frame of the current picture block in the second direction.

Condition D. The TID of the current frame is greater than or equal to a preset value.

The preset condition in this embodiment of this application may be preset, or may be specified in a higher layer syntax, for example, in a parameter set such as the SPS, the PPS, the slice header, or the slice segment header. This is not specifically limited in this embodiment of this application.

Condition E. mvd_l1_zero_flag of the current frame is 0.
mvd_l1_zero_flag is a flag obtained by the video decoder 202 through parsing. When mvd_l1_zero_flag is 1, it indicates that an MVD of List1 does not need to be parsed. (mvd_l1_zero_flag equal to 1 indicates that the mvd_coding (x0, y0, 1) syntax structure is not parsed and MvdL1[x0][y0][compIdx] is set equal to 0 for compIdx=0 . . . 1. mvd_l1_zero_flag equal to 0 indicates that the mvd_coding (x0, y0, 1) syntax structure is parsed.)

Specifically, for the condition B (or the condition C), the video decoder 202 obtains a sequence number of a reference frame from each of the first reference frame list and the second reference frame list, and determines whether the obtained sequence number of the reference frame and the sequence number of the current frame satisfy the condition B or the condition C. The indication information is obtained when the condition B (or the condition C) is satisfied.

Optionally, for the condition A, the video decoder 202 sets an index value (SymRefIdxX) of a reference frame in the first direction to 0, and sets an index value (SymRefIdxY) of a reference frame in the second direction to 0.

Optionally, for the condition B, the video decoder 202 searches the first reference frame list for a reference frame POC_listX that is closest to the current frame and whose sequence number is less than the sequence number of the current frame, and the video decoder 202 searches the second reference frame list for a reference frame POC_listY that satisfies a condition POC_Cur−POC_listX=POC_listY−POC_Cur. If the reference frames POC_listX and POC_listY that satisfy the requirements can be found in this searching manner, an index value (SymRefIdxX) of a reference frame in the first direction is set to an index value of POC_listX in the first reference frame list, and an index value (SymRefIdxY) of a reference frame in the second direction is set to an index value of POC_listY in the second reference frame list. Optionally, if the reference frames POC_listX and POC_listY that satisfy the requirements cannot be found, the video decoder 202 further searches for a reference frame POC_listX that is closest to the current frame and whose sequence number is greater than the sequence number of the current frame, and searches the second reference frame list for a reference frame POC_listY that satisfies POC_Cur−POC_listX=POC_listY−POC_Cur. If the reference frames POC_listX and POC_listY that satisfy the requirements can be found in this searching manner, an index value (SymRefIdxX) of a reference frame in the first direction is set to an index value of POC_listX in the first reference frame list, and an index value (SymRefIdxY) of a reference frame in the second direction is set to an index value of POC_listY in the second reference frame list.

Optionally, for the condition C, the video decoder 202 searches the first reference frame list for a reference frame POC_listX that is closest to the current frame and whose sequence number is less than the sequence number of the current frame, and the video decoder 202 searches the second reference frame list for a reference frame POC_listY that is closest to the current frame and whose sequence number is greater than the sequence number of the current frame. If the reference frames POC_listX and POC_listY that satisfy the requirements can be found in this searching manner, an index value (SymRefIdxX) of a reference frame in the first direction is set to an index value of POC_listX in the first reference frame list, and an index value (SymRefIdxY) of a reference frame in the second direction is set to an index value of POC_listY in the second reference frame list. Optionally, if the reference frames POC_listX and POC_listY that satisfy the requirements cannot be found, the video decoder 202 further searches for a reference frame POC_listX that is closest to the current frame and whose sequence number is greater than the sequence number of the current frame, and searches the second reference frame list for a reference frame POC_listY that is closest to the current frame and whose sequence number is less than the sequence number of the current frame. If the reference frames POC_listX and POC_listY that satisfy the requirements can be found in this searching manner, an index value (SymRefIdxX) of a reference frame in the first direction is set to an index value of POC_listX in the first reference frame list, and an index value (SymRefIdxY) of a reference frame in the second direction is set to an index value of POC_listY in the second reference frame list.

Optionally, the index value (SymRefIdxX) of the reference frame in the first direction and the index value (SymRefIdxY) of the reference frame in the second direction may alternatively be determined in the following manner.

The video decoder 202 searches the first reference frame list for a reference frame POC_listX_0 that is closest to the current frame and whose sequence number is less than the sequence number of the current frame, and a reference frame POC_listX_1 that is closest to the current frame and whose sequence number is greater than the sequence number of the current frame. The video decoder 202 searches the second reference frame list for a reference frame POC_listY_0 that is closest to the current frame and whose sequence number is greater than the sequence number of the current frame, and a reference frame POC_listY_1 that is closest to the current frame and whose sequence number is less than the sequence number of the current frame.

If a reference frame combination (POC_listX_0 and POC_listY_0) that satisfies the requirements can be found in this searching manner, the index value (SymRefIdxX) of the reference frame in the first direction is set to an index value of POC_listX_0 in the first reference frame list, and the index value (SymRefIdxY) of the reference frame in the second direction is set to an index value of POC_listY_0 in the second reference frame list.

Otherwise, if a reference frame combination (POC_listX_1 and POC_listY_1) that satisfies the requirements can be found in this searching manner, the index value (SymRefIdxX) of the reference frame in the first direction is set to an index value of POC_listX_1 in the first reference frame list, and the index value (SymRefIdxY) of the reference frame in the second direction is set to an index value of POC_listY_1 in the second reference frame list.

Optionally, the index value (SymRefIdxX) of the reference frame in the first direction and the index value (SymRefIdxY) of the reference frame in the second direction may alternatively be determined in the following manner.

The video decoder 202 searches the first reference frame list for a reference frame POC_listX_0 that is closest to the current frame and whose sequence number is less than the sequence number of the current frame, and a reference frame POC_listX_1 that is closest to the current frame and whose sequence number is greater than the sequence number of the current frame. The video decoder 202 searches the second reference frame list for a reference frame POC_listY_0 that is closest to the current frame and whose sequence number is greater than the sequence number of the current frame, and a reference frame POC_listY_1 that is closest to the current frame and whose sequence number is less than the sequence number of the current frame.

If only the reference frame combination POC_listX_0 and POC_listY_0 that satisfies the requirements is found in this searching manner, the index value (SymRefIdxX) of the reference frame in the first direction is set to an index value of POC_listX_0 in the first reference frame list, and the index value (SymRefIdxY) of the reference frame in the second direction is set to an index value of POC_listY_0 in the second reference frame list.

If only the reference frame combination POC_listX_1 and POC_listY_1 that satisfies the requirements is found in this searching manner, the index value (SymRefIdxX) of the reference frame in the first direction is set to an index value of POC_listX_1 in the first reference frame list, and the index value (SymRefIdxY) of the reference frame in the second direction is set to an index value of POC_listY_1 in the second reference frame list.

If both the reference frame combination POC_listX_0 and POC_listY_0 that satisfy the requirements and the reference frame combination POC_listX_1 and POC_listY_1 that satisfy the requirements are found in this searching manner, a distance POC_DIS_0 (POC_listY_0−POC_listX_0) of the reference frame combination between POC_listY_0 and POC_listX_0 is further calculated, and a distance POC_DIS_1 (POC_listX_1−POC_listY_1) of the reference frame combination between POC_listX_1 and the POC_listY_1 is further calculated. If POC_DIS_0 is less than or equal to POC_DIS_1, the index value (SymRefIdxX) of the reference frame in the first direction is set to an index value of POC_listX_0 in the first reference frame list, and the index value (SymRefIdxY) of the reference frame in the second direction is set to an index value of POC_listY_0 in the second reference frame list. Otherwise, the index value (SymRefIdxX) of the reference frame in the first direction is set to an index value of POC_listX_1 in the first reference frame list, and the index value (SymRefIdxY) of the reference frame in the second direction is set to an index value of POC_listY_1 in the second reference frame list.

Optionally, the index value (SymRefIdxX) of the reference frame in the first direction and the index value (SymRefIdxY) of the reference frame in the second direction may alternatively be determined in the following manner.

The video decoder 202 searches the first reference frame list for a reference frame POC_listX_0 that is closest to the current frame and whose sequence number is less than the sequence number of the current frame, and a reference frame POC_listX_1 that is closest to the current frame and whose sequence number is greater than the sequence number of the current frame. The video decoder 202 searches the second reference frame list for a reference frame POC_listY_0 that is closest to the current frame and whose sequence number is greater than the sequence number of the current frame, and a reference frame POC_listY_1 that is closest to the current frame and whose sequence number is less than the sequence number of the current frame.

If only the reference frame combination POC_listX_0 and POC_listY_0 that satisfies the requirements is found in this searching manner, the index value (SymRefIdxX) of the reference frame in the first direction is set to an index value of POC_listX_0 in the first reference frame list, and the index value (SymRefIdxY) of the reference frame in the second direction is set to an index value of POC_listY_0 in the second reference frame list.

If only the reference frame combination POC_listX_1 and POC_listY_1 that satisfies the requirements is found in this searching manner, the index value (SymRefIdxX) of the reference frame in the first direction is set to an index value of POC_listX_1 in the first reference frame list, and the index value (SymRefIdxY) of the reference frame in the second direction is set to an index value of POC_listY_1 in the second reference frame list.

If both the reference frame combination POC_listX_0 and POC_listY_0 that satisfies the requirements and the reference frame combination POC_listX_1 and POC_listY_1 that satisfies the requirement are found in the searching manner, absolute distances POC_DIS_listX0, POC_DIS_listY0, POC_DIS_listX1, and POC_DIS_listY1 between the current frame POC_Cur and four reference frames POC_listY_0, POC_listX_0, POC_listX_1, and POC_listY_1 are further calculated. A reference frame combination in which a reference frame with a smallest distance from the current frame POC_Cur in the four distances is selected as an optimal combination k, the index value (SymRefIdxX) of the reference frame in the first direction is set to an index value of the optimal combination POC_listX k in the first reference frame list, and the index value (SymRefIdxY) of the reference frame in the second direction is set to an index value of POC_listY k in the second reference frame list.

Optionally, the index value (SymRefIdxX) of the reference frame in the first direction and the index value (SymRefIdxY) of the reference frame in the second direction may alternatively be determined in the following manner.

The video decoder 202 searches the first reference frame list and the second reference frame list for all reference frame combinations POC_listX_i and POC_listY_i that satisfy POC_Cur−POC_listX_i=POC_listY_i−POC_Cur, where i ranges from 1 to N, and N represents a maximum quantity of reference frame combinations that satisfy the condition. If a quantity of found reference frame combinations is 1, the index value (SymRefIdxX) of the reference frame in the first direction is directly set to an index value of POC_listX_1 in the first reference frame list, and the index value (SymRefIdxY) of the reference frame in the second direction is set to an index value of POC_listY_1 in the second reference frame list. If a quantity of found reference frame combinations is greater than 1, an absolute distance POC_DIS_i (abs(POC_listY_i−POC_listX_i)) between POC_listY_i and POC_listX_i of each reference frame combination is further calculated, a reference frame combination with a smallest distance is selected, the index value (SymRefIdxX) of the reference frame in the first direction is set to an index value of POC_listX_i in the first reference frame list, and the index value (SymRefIdxY) of the reference frame in the second direction is set to an index value of POC_listY_i in the second reference frame list.

Optionally, the foregoing found reference frames POC_listX and POC_listY both are short-term reference frames.

Optionally, the foregoing found reference frames POC_listX and POC_listY are of a same reference frame type, for example, both are short-term reference frames, or both are long-term reference frames.

In this embodiment of this application, a method for which "the video decoder 202 obtains the indication information when determining that the inter prediction mode is the bidirectional inter prediction mode and the feature information of the current frame satisfies a preset condition" is the same as the method for which "the video decoder 202 obtains indication information when determining that the inter prediction mode is a bidirectional inter prediction mode".

With reference to the foregoing descriptions, Table 1 is a syntax table used by the video decoder 202 to obtain the indication information in the first implementation when it is determined that the inter prediction mode is the bidirectional inter prediction mode and the feature information of the current frame satisfies the preset condition. prediction_unit( ) represents a syntax structure of a prediction picture block, and describes a method for determining motion information of each subblock in the current picture block.

In Table 1, x0 and y0 respectively represent a horizontal coordinate offset and a vertical coordinate offset of a subblock in the current picture block relative to the top-left sample of the current picture block, nPbW represents the width of the current picture block, and nPbH represents the height of the current picture block. When a value of inter_pred_idc[x0][y0] is PRED_L0, it indicates that inter prediction on a current subblock is forward prediction. When a value of inter_pred_idc[x0][y0] is PRED_L1, it indicates that inter prediction on a current subblock is backward prediction. When a value of inter_pred_idc[x0][y0] is PRED_BI, it indicates that inter prediction on a current subblock is bidirectional prediction.

For bidirectional inter prediction (that is, inter_pred_idc[x0][y0]—PRED_BI), if the preset condition (conditions) is satisfied, mv_derived_flag_l0[x0][y0] is parsed. If the value of mv_derived_flag_l0 is not the first preset value, mv_derived_flag_l1[x0][y0] is parsed. When the value of mv_derived_flag_l0 is the first preset value or the value of mv_derived_flag_l1[x0][y0] is the fifth preset value, motion information of the subblock of the current picture block is determined. To be specific, an index value ref_idx_l0[x0][y0] of a reference frame, a MVP identifier mvp_l0_flag[x0][y0], and a MVD mvd_coding(x0, y0, 0) are determined.

TABLE 1

```
prediction_unit(x0,y0,nPbW,nPbH) {
    ...
    /* motion vector coding */
    if( slice_type==B )
        inter_pred_idc_[x0][y0]
    if( inter_pred_idc[x0][y0]==PRED_L0 ) {
        if( num_ref_idx_l0_active_minus1 > 0 )
            ref_idx_l0[x0][y0]
        mvd_coding( x0,y0,0 )
        mvp_l0_flag[x0][y0]
    }
    if( inter_pred_idc[x0][y0]==PRED_L1 ) {
        if( num_ref_idx_l1_active_minus1 > 0 )
            ref_idx_l1 [x0][y0]
    mvd_coding( x0,y0,1 )
    mvp_l1_flag [x0][y0]
    }
    if( inter_pred_idc[x0][y0]==PRED_BI ) {
        if( conditions ) {
            mv_derived_flag_l0[x0][y0]
            if( !mv_derived_flag_l0[x0][y0]) {
                mv_derived_flag_l1[x0][y0]
            }
            if( !mv_derived_flag_l0[x0][y0]) {
                if( num_ref_idx_l0_active_minus1 > 0 )
                    ref_idx_l0[x0][y0]
                mvd_coding( x0,y0,0 )
                mvp_l0_flag[x0][y0]
            }
            if( !mv_derived_flag_l1[x0][y0]) {
                if( num_ref_idx_l1_active_minus1 > 0 )
                    ref_idx_l1[x0][y0]
                mvd_coding(x0,y0,0 )
```

TABLE 1-continued

```
                mvp_l1_flag[x0][y0]
            }
}.
```

With reference to the foregoing descriptions, Table 2 is a syntax table used by the video decoder 202 to obtain the indication information in the third implementation when it is determined that the inter prediction mode is the bidirectional inter prediction mode and the feature information of the current frame satisfies the preset condition.

In Table 2, for bidirectional inter prediction (that is, inter_pred_idc[x0][y0]==PRED_BI), if the preset condition is satisfied, derived_mv_flag[x0][y0] is parsed. If a value of derived_mv_flag[x0][y0] is the second preset value, motion information of the subblock of the current picture block is determined. To be specific, an index value ref_idx_lx[x0][y0] of a reference frame, a MVP identifier mvp_lx_flag[x0][y0], and a MVD mvd_coding(x0, y0, x) are determined.

TABLE 2

```
prediction_unit(x0,y0,nPbW,nPbH) {
    ...
    /* motion vector coding */
    if( slice_type==B )
        inter pred_idc_[x0][y0]
    if( inter_pred_idc[x0][y0]==PRED_L0 ) {
        if( num_ref_idx_l0_active_minus1 > 0 )
            ref_idx_l0[x0][y0]
        mvd_coding( x0,y0,0 )
        mvp_l0_flag[x0][y0]
    }
    if( inter_pred_idc[x0][y0]==PRED_L1 ) {
        if( num_ref_idx_l1_active_minus1 > 0 )
            ref_idx_l1[x0][y0]
    mvd_coding( x0,y0,1 )
    mvp_l1_flag[x0][y0]
    }
    if( inter_pred_idc[x0][y0]==PRED_BI ) {
        if( conditions ) {
            derived_mv_flag[x0][y0]
            if( derived_mv_flag[x0][y0] ) {
                if( num_ref_idx_lx_active_minus1 > 0 )
                    ref_idx_lx[x0][y0]
                mvd_coding( x0, y0, x )
                mvp_lx_flag[ x0 ][ y0 ]
            } else {
                ...
            }
}.
```

With reference to the foregoing descriptions, Table 3 is a syntax table used by the video decoder 202 to obtain the indication information in the fourth implementation when it is determined that the inter prediction mode is the bidirectional inter prediction mode and the feature information of the current frame satisfies the first preset condition.

In Table 3, for bidirectional inter prediction (that is, inter_pred_idc[x0][y0]==PRED_BI), if the preset condition is satisfied, derived_mv_flag[x0][y0] is parsed. If a value of derived_mv_flag[x0][y0] is the fourth preset value, derived_ref_num is determined, and when a value of derived_ref_num is greater than 1, motion information of the subblock of the current picture block is determined. To be specific, an index value ref_idx_lx[x0][y0] of a reference frame, a MVP identifier mvp_lx_flag[x0][y0], and a MVD mvd_coding(x0, y0, x) are determined.

TABLE 3

```
prediction_unit(x0,y0,nPbW,nPbH) {
...
/* motion vector coding */
    if( slice_type==B )
        inter_pred_idc[x0][y0]
    if( inter_pred_idc[x0][y0]==PRED_L0 ) {
        if( num_ref_idx_l0_active_minus1 > 0 )
            ref_idx_l0[x0][y0]
        mvd_coding( x0,y0,0 )
        mvp_l0_flag[x0][y0]
        }
    if( inter_pred_idc[x0][y0]==PRED_L1 ) {
        if( num_ref_idx_l1_active_minus1 > 0 )
            refidxl1[x0][y0]
    mvd_coding( x0,y0,1 )
    mvp_l1_flag[x0][y0]
    }
    if( inter_pred_idc[x0][y0]==PRED_BI ) {
        if( conditions ) {
            derived_mv_flag[x0][y0]
            if( derived_mv_flag[x0][y0] ) {
            if( num_ref_idx_lx_active_minus1 > 0 && derived_ref_num > 1)
            ref_idx_lx[x0][y0]
            mvd_coding(x0,y0,x )
            mvp_lx_flag[x0][y0]
            } else {
            ...
        }
    }
}.
```

The first identifier, the second identifier, the third identifier, and the fourth identifier all may be preset, or may be specified in a higher layer syntax, for example, in a parameter set such as an SPS, a PPS, a slice header, or a slice segment header. This is not specifically limited in this embodiment of this application.

The video decoder 202 obtains the indication information when determining that the inter prediction mode is the bidirectional inter prediction mode and the feature information of the current frame satisfies the preset condition. This effectively increases a decoding rate of the video decoder 202, and reduces information redundancy.

S401. The video decoder 202 obtains the first motion information.

Optionally, the video decoder 202 parses the bitstream to obtain an index value of the first reference frame, a first MVP identifier, and a first MVD, that is, to obtain the first motion information. The first MVP identifier is used to indicate an index value of a first predicted motion vector in a first candidate predicted motion vector list, the first predicted motion vector is a predicted motion vector of the current picture block in the first direction, the first MVD is a difference between the first predicted motion vector and a first motion vector, and the first motion vector is a motion vector of the current picture block in the first direction.

Optionally, a reference frame at a first location in the reference frame list is usually a frame closest to the current frame. Therefore, an index value ref_lX_idx of the first reference frame may be directly set to 0.

Optionally, when the video decoder 202 determines, based on the preset condition B or C, whether to obtain the indication information, the video decoder 202 may set the index value ref_lX_idx of the first reference frame to a predetermined value SymRefIdxX.

Optionally, the first candidate predicted motion vector list is constructed based on the index value of the first reference frame. Specifically, in a process of constructing the first candidate predicted motion vector list, a motion vector of a neighboring decoded picture block of the current picture block is obtained. The sequence number of the first reference frame is determined based on the index value of the first reference frame and the first reference frame list. If a sequence number of a reference frame of the neighboring decoded picture block is different from the sequence number of the first reference frame, the motion vector of the neighboring decoded picture block needs to be scaled to point to the first reference frame, and then is added to the first candidate predicted motion vector list.

In each of the syntax tables shown in Table 1 to Table 3, the video decoder 202 determines motion information of the subblock of the current picture block in the first direction.

S402. The video decoder 202 determines the second motion information based on the first motion information.

In a first implementation, a method for determining the second motion information by the video decoder 202 is as follows. The video decoder 202 selects the index value of the first reference frame from the first motion information, and determines the sequence number of the first reference frame based on the index value of the first reference frame and the first reference frame list, calculates the sequence number of the second reference frame based on the sequence number of the current frame and the sequence number of the first reference frame according to a preset formula, determines the index value of the second reference frame based on the sequence number of the second reference frame and the second reference frame list, and determines the second motion information based on the first motion information and the index value of the second reference frame.

Herein, the preset formula may be POC_listY=2*POC_Cur−POC_listX. POC_Cur represents the sequence number of the current frame, POC_listX represents the sequence number of the first reference frame, and POC_listY represents the sequence number of the second reference frame.

For example, if the sequence number of the current frame is 4, the sequence number of the first reference frame is 2, the second reference frame list is [6, 8], and it is determined, according to Formula POC_listY=2*POC_Cur−POC_listX, that the sequence number of the second reference frame is 6, the video decoder 202 determines that the index value ref_lY_idx of the second reference frame is 0.

Optionally, the preset formula may alternatively be (POC_Cur−POC_listX)*(POC_listY−POC_Cur)>0. It should be noted that, if sequence numbers of a plurality of reference frames in the second reference frame list satisfy the formula, the video decoder 202 first selects a reference frame with a smallest abs((POC_listY−POC_Cur)−(POC_Cur−POC_listX)), and then selects a reference frame with a smallest abs(POC_listY−POC_Cur), to determine the index value of the second reference frame, where abs represents an absolute value function.

For example, if the sequence number of the current frame is 4, the sequence number of the first reference frame is 2, the second reference frame list is [5, 7, 8], and it is determined, according to Formula (POC_Cur−POC_listX)*(POC_listY−POC_Cur)>0, that the sequence number of the second reference frame is 5, the video decoder 202 determines that the index value ref_lY_idx of the second reference frame is 0.

Optionally, the preset formula may alternatively be POC_listX≠POC_listY. It should be noted that, if sequence numbers of a plurality of reference frames in the second reference frame list satisfy the formula, the video decoder 202 first selects a reference frame with a smallest abs((POC_listY−POC_Cur)−(POC_Cur−POC_listX)), and then selects a reference frame with a smallest abs (POC_listY−POC_Cur), to determine the index value of the second reference frame, where abs represents an absolute value function.

For example, if the sequence number of the current frame is 4, the sequence number of the first reference frame is 2, the second reference frame list is [3, 2, 1, 0], and it is determined, according to Formula POC_listX≠POC_listY, that the sequence number of the second reference frame is 3, the video decoder 202 determines that the index value ref_lY_idx of the second reference frame is 0.

Optionally, the preset formula may alternatively be POC_listY0=2*POC_Cur−POC_listX, (POC_Cur−POC_listX)*(POC_listY0'−POC_Cur)>0, and POC_listX≠POC_listY0". In this case, a method for determining the index value of the second reference frame by the video decoder 202 is specifically calculating a first sequence number based on the sequence number of the current frame and the sequence number of the first reference frame according to Formula POC_listY0=2*POC_Cur−POC_listX, where POC_Cur represents the sequence number of the current frame, POC_listX represents the sequence number of the first reference frame, and POC_listY0 represents the first sequence number, when the second reference frame list includes the first sequence number, determining, as the index value of the second reference frame, a number of a reference frame represented by the first sequence number in the second reference frame list, or when the second reference frame list does not include the first sequence number, calculating a second sequence number based on the sequence number of the current frame and the sequence number of the first reference frame according to (POC_Cur−POC_listX)*(POC_listY0'−POC_Cur)>0, where POC_listY0' represents the second sequence number, and when the second reference frame list includes the second sequence number, determining, as the index value of the second reference frame, a number of a reference frame represented by the second sequence number in the second reference frame list, or when the second reference frame list does not include the second sequence number, calculating a third sequence number based on the sequence number of the current frame and the sequence number of the first reference frame according to Formula POC_listX≠POC_listY0", where POC_listY0" represents the third sequence number, and determining, as the index value of the second reference frame, a number of the reference frame represented by the third sequence number in the second reference frame list.

Optionally, a reference frame at a first location in the reference frame list is usually a frame closest to the current frame. Therefore, the index value ref_lY_idx of the second reference frame may be directly set to 0, indicating to point to the first location.

Optionally, when the video decoder 202 determines, based on the preset condition B or C, whether to obtain the indication information, the video decoder 202 may set the index value ref_lY_idx of the second reference frame to a predetermined value SymRefIdxY.

In a second implementation, a method used by the video decoder 202 to determine the second motion information is as follows. The video decoder 202 parses the bitstream to obtain the index value of the second reference frame, and determines the second motion information based on the first motion information and the index value of the second reference frame. The index value of the second reference frame may be preset, or may be specified in a parameter set such as an SPS, a PPS, a slice header, or a slice segment header. This is not specifically limited in this embodiment of this application.

It can be learned that, in both the first implementation and the second implementation, the video decoder 202 determines the second motion information based on the first motion information and the index value of the second reference frame.

Optionally, the video decoder 202 may calculate all motion information of the current picture block in the second direction, or may calculate a part of motion information of the current picture block in the second direction.

The following describes a process in which the video decoder 202 determines the second motion information based on the first motion information and the index value of the second reference frame.

Optionally, a method for which "the video decoder 202 determines the second motion information based on the first motion information and the index value of the second reference frame" may be obtaining the index value of the first reference frame in the first motion information, and determining the sequence number of the first reference frame based on the index value of the first reference frame and the first reference frame list, obtaining the index value of the second reference frame, and determining the sequence number of the second reference frame based on the index value of the second reference frame and a second reference frame list, determining the first motion vector (a motion vector of the current picture block in the first direction) based on the first MVD and the first MVP identifier in the first motion information, and determining a second motion vector in the second motion information according to the following formula, where the second motion vector is a motion vector of the current picture block in the second direction:

$$mv\_lY = \frac{POC\_Cur - POC\_listY}{POC\_Cur\_POC\_listX} \times mv\_lX.$$

mv_lY represents the second motion vector, POC_Cur represents the sequence number of the current frame, POC_listX represents the sequence number of the first reference frame, POC_listY represents the sequence number of the second reference frame, and mv_lX represents the first motion vector.

The video decoder 202 constructs a candidate motion information list in a manner that is the same as the manner in which the encoder side constructs the candidate motion information list in the AMVP mode or the merge mode, and determines the first predicted motion vector in the candidate motion information list based on the first MVP identifier. In this way, the video decoder 202 may determine a sum of the first predicted motion vector and the first MVD as the first motion vector.

Optionally, in a case in which the first reference frame is a forward reference frame of the current picture block and the second reference frame is a backward reference frame of the current picture block, or in a case in which the first reference frame is a backward reference frame of the current picture block and the second reference frame is a forward reference frame of the current picture block, or in a case in which the first reference frame and the second reference frame each are a forward reference frame of the current picture block, or in a case in which the first reference frame and the second reference frame each are a backward reference frame of the current picture block, the video decoder 202 may directly set mv_lY=−mv_lX.

Optionally, the video decoder 202 may not perform determining, and directly set mv_lY=−mv_lX.

For example, both the "case in which the first reference frame is a forward reference frame of the current picture block and the second reference frame is a backward reference frame of the current picture block" and the "case in which when the first reference frame is a backward reference frame of the current picture block and the second reference frame is a forward reference frame of the current picture block" may be represented by using Formula (POC_Cur−POC_listX)*(POC_listY−POC_Cur)>0 or Formula POC_listY=2*POC_Cur−POC_listX.

Both the "case in which the first reference frame and the second reference frame each are a forward reference frame of the current picture block" and the "case in which the first reference frame and the second reference frame each are a backward reference frame of the current picture block" may be represented by using Formula (POC_Cur−POC_listX)*(POC_listY−POC_Cur)<0.

Optionally, a method for which "the video decoder 202 determines the second motion information based on the first motion information and the index value of the second reference frame" may be obtaining the index value of the first reference frame in the first motion information and the first MVD, and determining the sequence number of the first reference frame based on the index value of the first reference frame and the first reference frame list, obtaining the index value of the second reference frame, determining the sequence number of the second reference frame based on the index value of the second reference frame and the second reference frame list, and determining a second predicted motion vector based on the index value of the second reference frame and the second candidate predicted motion vector list, where the second predicted motion vector is a predicted motion vector of the current picture block in the second direction, determining a second MVD in the second motion information according to the following formula, and determining a second motion vector based on the second predicted motion vector and the second MVD, where the second motion vector is a motion vector of the current picture block in the second direction:

$$mvd\_lY = \frac{POC\_Cur - POC\_listY}{POC\_Cur\_POC\_listX} \times mvd\_lX.$$

mvd_lY represents the second MVD, POC_Cur represents a sequence number of a current frame, POC_listX represents the sequence number of the first reference frame, POC_listY represents the sequence number of the second reference frame, and mvd_lX represents the first MVD.

Optionally, the second candidate predicted motion vector list is constructed based on the index value of the second reference frame. Specifically, in a process of constructing the second candidate predicted motion vector list, a motion vector of a neighboring decoded picture block of the current picture block is obtained. The sequence number of the second reference frame is determined based on the index value of the second reference frame and the second reference frame list. If a sequence number of a reference frame of the neighboring decoded picture block is different from the sequence number of the second reference frame, the motion vector of the neighboring decoded picture block needs to be scaled to point to the second reference frame, and then is added to the second candidate predicted motion vector list.

Optionally, in a case in which the first reference frame is a forward reference frame of the current picture block and the second reference frame is a backward reference frame of the current picture block, or in a case in which the first reference frame is a backward reference frame of the current picture block and the second reference frame is a forward reference frame of the current picture block, or in a case in which the first reference frame and the second reference frame each are a forward reference frame of the current picture block, or in a case in which the first reference frame and the second reference frame each are a backward reference frame of the current picture block, the video decoder 202 may directly set mvd_lY=−mvd_lX. For example, if (POC_Cur−POC_listX)*(POC_listY−POC_Cur)>0, POC_listY=2*POC_Cur−POC_listX, or (POC_Cur−POC_listX)*(POC_listY−POC_Cur)<0, the video decoder 202 directly sets mvd_lY=−mvd_lX.

Optionally, the video decoder 202 may not perform determining, and directly set mvd_lY=−mvd_lX.

S403. The video decoder 202 determines a prediction sample of the current picture block based on the first motion information and the second motion information.

Optionally, the video decoder 202 determines the first motion vector and the second motion vector in S402. In this way, the video decoder 202 may determine a first reference picture block based on the first motion vector, the index value of the first reference frame, and the first reference frame list, determine a second reference picture block based on the second motion vector, the index value of the second reference frame, and the second reference frame list, and further determine the prediction sample of the current picture block based on the first reference picture block and the second reference picture block. That is, the video decoder 202 completes a MC process.

For a method used by the video decoder 202 to determine the prediction sample of the current picture block based on the first reference picture block and the second reference picture block, refer to any existing method. This is not specifically limited in this embodiment of this application.

In the bidirectional inter prediction method provided in this embodiment of this application, the video decoder 202 may obtain only the first motion information from the encoded bitstream. After obtaining the first motion information, the video encoder 202 calculates the second motion information based on the first motion information, and further determines the prediction sample of the current picture block based on the first motion information and the second motion information. In comparison with a conventional technology, in the method provided in this application, motion information of all picture blocks in all directions no longer needs to be transmitted. This effectively reduces an amount of transmitted motion information, and improves effective utilization of transmission resources, a transmission rate, and coding compression efficiency.

The bidirectional inter prediction method shown in FIG. 4 is described for the current picture block, that is, may be understood as performing inter prediction on the current picture block based on the AMVP mode.

It is easy to understand that the bidirectional inter prediction method provided in this application is also applicable to a non-translational motion model prediction mode, for example, a 4-parameter affine transform motion model, a 6-parameter affine transform motion model, or an 8-parameter bilinear motion model. In this scenario, the current picture block includes at least one subblock, and the motion information of the current picture block includes motion information of each of all subblocks of the current picture block. A method used by the video decoder 202 to determine the motion information (motion information in the first direction and motion information in the second direction) of each subblock is similar to the method used by the video decoder 202 to determine the motion information of the current picture block.

In the non-translational motion model prediction mode, the video decoder 202 calculates a motion vector of an $i^{th}$ control point in the second direction based on a motion vector of the $i^{th}$ control point in the first direction according to the following formula:

$$mvi\_lY = \frac{POC\_Cur - POC\_listY}{POC\_Cur\_POC\_listX} \times mvi\_lX.$$

In the formula, mvi_lY represents the motion vector of the $i^{th}$ control point in the second direction, mvi_lX represents the motion vector of the $i^{th}$ control point in the first direction, POC_Cur represents the sequence number of the current frame, POC_listY represents the sequence number of the second reference frame, and POC_listX represents the sequence number of the first reference frame.

Correspondingly, the video decoder 202 calculates a MVD of the $i^{th}$ control point in the second direction based on a MVD of the $i^{th}$ control point in the first direction according to the following formula:

$$mvdi\_lY = \frac{POC\_Cur - POC\_listY}{POC\_Cur\_POC\_listX} \times mvdi\_lX.$$

In the formula, mvdi_lY represents the MVD of the $i^{th}$ control point in the second direction, mvdi_lX represents the MVD of the $i^{th}$ control point in the first direction, POC_Cur represents the sequence number of the current frame, POC_listY represents the sequence number of the second reference frame, and POC_listX represents the sequence number of the first reference frame.

Corresponding to the video decoder 202, in this embodiment of this application, the video encoder 102 performs bidirectional ME on the current picture block, to determine the motion information of the current picture block in the first direction, and calculates the motion information of the current picture block in the second direction based on the motion information of the current picture block in the first direction. In this way, the video encoder 102 determines the prediction picture block of the current picture block based on the motion information of the current picture block in the first direction and the motion information of the current picture block in the second direction. Then, the video encoder 102 performs operations such as transform and quantization on a residual between the current picture block and the prediction picture block of the current picture block to generate a bitstream, and sends the bitstream to the video decoder 202. The bitstream includes the motion information of the current picture block in the first direction.

For a method for which "the video encoder 102 calculates the motion information of the current picture block in the second direction based on the motion information of the current picture block in the first direction", refer to the foregoing method for which "the video decoder 202 determines the second motion information based on the first motion information", that is, refer to the descriptions in S402. Details are not described in this application.

In conclusion, according to the bidirectional inter prediction method provided in this application, during bidirectional inter prediction, motion information of all picture blocks in all directions does not need to be transmitted, but only motion information in a specific direction needs to be transmitted. This effectively reduces an amount of transmitted motion information, and improves effective utilization of transmission resources, a transmission rate, and coding compression efficiency.

An embodiment of this application provides a bidirectional inter prediction apparatus. The bidirectional inter prediction apparatus may be a video decoder. Specifically, the bidirectional inter prediction apparatus is configured to perform the steps performed by the video decoder 202 in the foregoing bidirectional inter prediction method. The bidirectional inter prediction apparatus provided in this embodiment of this application may include modules for corresponding steps.

In the embodiments of this application, the bidirectional inter prediction apparatus may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. In this embodiment of this application, division into the modules is an example, and is merely logical function division. There may be another division manner in actual implementation.

Figure 5:
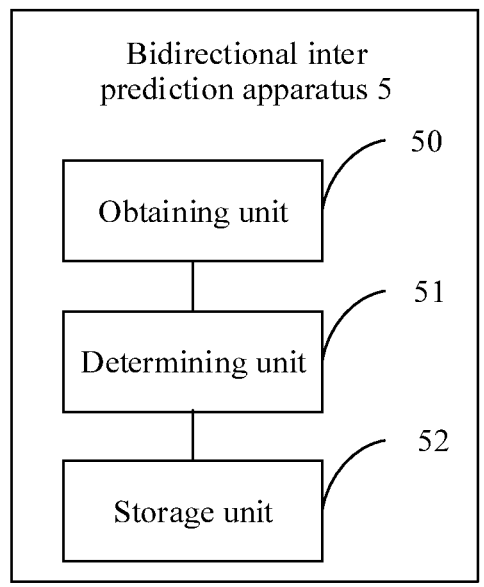
FIG. 5 is a first schematic structural diagram of a bidirectional inter prediction apparatus according to an embodiment of this application.

When each functional module is obtained through division based on a corresponding function, FIG. 5 is a possible schematic structural diagram of the bidirectional inter prediction apparatus in the foregoing embodiments. As shown in FIG. 5, a bidirectional inter prediction apparatus 5 includes an obtaining unit 50 and a determining unit 51.

The obtaining unit 50 is configured to support the bidirectional inter prediction apparatus in performing S400, S401, and the like in the foregoing embodiment, and/or another process of the technology described in this specification.

The determining unit 51 is configured to support the bidirectional inter prediction apparatus in performing S402, S403, and the like in the foregoing embodiment, and/or another process of the technology described in this specification.

All related content of the steps in the foregoing method embodiment may be cited in functional descriptions of the corresponding functional modules. Details are not described herein again.

Certainly, the bidirectional inter prediction apparatus provided in this embodiment of this application includes but is not limited to the foregoing modules. For example, the bidirectional inter prediction apparatus may further include a storage unit 52.

The storage unit 52 may be configured to store program code and data of the bidirectional inter prediction apparatus.

Figure 6:
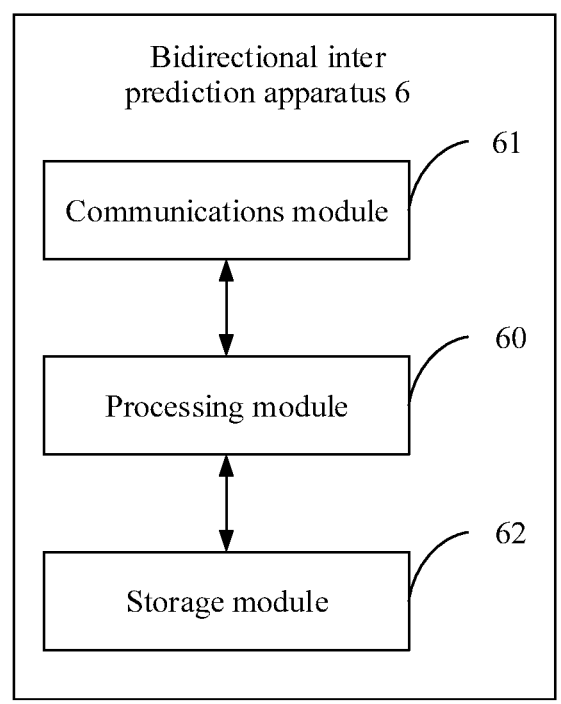
FIG. 6 is a second schematic structural diagram of a bidirectional inter prediction apparatus according to an embodiment of this application.

When an integrated unit is used, FIG. 6 is a schematic structural diagram of a bidirectional inter prediction apparatus according to an embodiment of this application. As shown in FIG. 6, a bidirectional inter prediction apparatus 6 includes a processing module 60 and a communications module 61. The processing module 60 is configured to control and manage an action of the bidirectional inter prediction apparatus, for example, perform steps performed by the obtaining unit 50 and the determining unit 51, and/or configured to perform another process of the technology described in this specification. The communications module 61 is configured to support interaction between the bidirectional inter prediction apparatus and another device. As shown in FIG. 6, the bidirectional inter prediction apparatus may further include a storage module 62. The storage module 62 is configured to store program code and data of the bidirectional inter prediction apparatus, for example, store content stored by the storage unit 52.

The processing module 60 may be a processor or a controller, for example, may be a CPU, a general-purpose processor, a DSP, an ASIC, an FPGA or another programmable logic device, a transistor logic device, a hardware component, or any combination thereof. The processing module 60 may implement or execute various example logical blocks, modules, and circuits described with reference to content disclosed in this application. The processing module may be a combination of processors implementing a computing function, for example, a combination of one or more microprocessors, or a combination of a DSP and a microprocessor. The communications module 61 may be a transceiver, an RF circuit, a communications interface, or the like. The storage module 62 may be a memory.

All related content of the scenarios in the foregoing method embodiment may be cited in function description of the corresponding functional modules. Details are not described herein again.

Both the bidirectional inter prediction apparatus 5 and the bidirectional inter prediction apparatus 6 may perform the bidirectional inter prediction method shown in FIG. 4. Specifically, the bidirectional inter prediction apparatus 5 and the bidirectional inter prediction apparatus 6 may be video decoding apparatuses or other devices having a video coding function. The bidirectional inter prediction apparatus 5 and the bidirectional inter prediction apparatus 6 may be configured to perform picture prediction in a decoding process.

This application further provides a terminal. The terminal includes one or more processors, a memory, and a communications interface. The memory and the communications interface are coupled to the one or more processors. The memory is configured to store computer program code. The computer program code includes an instruction. When the one or more processors execute the instruction, the terminal performs the bidirectional inter prediction method in the embodiments of this application.

The terminal herein may be a video display device, a smartphone, a portable computer, or another device that can process or play a video.

This application further provides a video decoder, including a non-volatile storage medium and a CPU. The non-volatile storage medium stores an executable program. The CPU is connected to the non-volatile storage medium, and executes the executable program to perform the bidirectional inter prediction method in the embodiments of this application.

This application further provides a decoder. The decoder includes the bidirectional inter prediction apparatus (the bidirectional inter prediction apparatus 5 or the bidirectional inter prediction apparatus 6) in the embodiments of this application, and a reconstruction module. The reconstruction module is configured to determine a reconstructed sample value of a current picture block based on a prediction sample obtained by the bidirectional inter prediction apparatus.

Another embodiment of this application further provides a computer-readable storage medium. The computer-readable storage medium includes one or more pieces of program code. The one or more programs include an instruction. When a processor of a terminal executes the program code, the terminal performs the bidirectional inter prediction method shown in FIG. 4.

In another embodiment of this application, a computer program product is further provided. The computer program product includes a computer-executable instruction. The computer-executable instruction is stored in a computer-readable storage medium. At least one processor of a terminal may read the computer-executable instruction from the computer-readable storage medium. The at least one processor executes the computer-executable instruction, to enable the terminal to perform the steps performed by the video decoder 202 in the bidirectional inter prediction method shown in FIG. 4.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated.

The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk solid-state disk (SSD)), or the like.

The foregoing description about implementations allows a person skilled in the art to understand that, for ease of description and brevity, division into the foregoing functional modules is used as an example for description. In an actual application, the foregoing functions can be allocated to different modules and implemented as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes various media that can store program code, such as a Universal Serial Bus (USB) flash drive, a removable hard disk, a ROM, a RAM, a magnetic disk, and an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for obtaining a bidirectional inter-prediction reference frame, comprising:
   determining a first reference frame list of a current picture block and a second reference frame list of the current picture block;
   determining, from the first reference frame list, whether a first X-directional reference frame that satisfies a first condition exists, wherein the first condition is that a first reference frame that is closest to a current frame has a first sequence number that is less than a second sequence number of the current frame, and wherein the current frame includes the current picture block; and
   determining, from the second reference frame list, whether a first Y-directional reference frame that satisfies a second condition exists, wherein the second condition is that a second reference frame that is closest to the current frame has a third sequence number that is greater than the second sequence number, wherein based on the first X-directional reference frame existing and the first Y-directional reference frame existing, the method further comprises:
   determining, from the first reference frame list, whether a second X-directional reference frame that satisfies a third condition exists;
   determining, from the second reference frame list, whether a second Y-directional reference frame that satisfies a fourth condition exists; and
   obtaining a plurality of index values of bidirectional reference frames of the current picture block based on the first X-directional reference frame existing, the second X-directional reference frame not existing, the first Y-directional reference frame existing, and the second Y-directional reference frame existing, wherein the index values are respectively set to a first index value of the first X-directional reference frame and a second index value of the first Y-directional reference frame.

2. The method of claim 1, wherein based on the first X-directional reference frame not existing and the first Y-directional reference frame existing, the method further comprises obtaining the index values based on the second X-directional reference frame existing and the second Y-directional reference frame existing.

3. The method of claim 2, wherein based on the first X-directional reference frame not existing and the first Y-directional reference frame existing, the third condition is that a first reference frame that is closest to the current frame has a first sequence number that is greater than a second sequence number of a current frame, wherein the fourth condition is that a second reference frame that is closest to the current frame has a third sequence number that is less than the second sequence number.

4. The method of claim 1, wherein the third condition is that a third reference frame that is closest to the current frame has a fourth sequence number that is greater than the second sequence number, wherein the fourth condition is that a fourth reference frame that is closest to the current frame has a fifth sequence number is less than the second sequence number.

5. The method of claim 1, wherein obtaining the index values further comprises:
   determining, based on a preset condition, either the first X-directional reference frame exists and the first Y-directional reference frame exists or that the second X-directional reference frame exists and the second Y-directional reference frame exists; and further obtaining the index values in response to determining that the first X-directional reference frame exists and the first Y-directional reference frame exists or that the second X-directional reference frame exists and the second Y-directional reference frame exists.

6. The method of claim 5, wherein the preset condition uses a smaller span between a first span and a second span for obtaining the index values, wherein the first span is between the first X-directional reference frame and the first Y-directional reference frame, wherein the second span is between the second X-directional reference frame and the second Y-directional reference frame.

7. The method of claim 5, wherein the preset condition uses a reference frame combination as a basis for obtaining the index values, wherein the reference frame combination includes a third reference frame, wherein the third reference frame is a frame, closest to the current frame, of the first X-directional reference frame, the first Y-directional reference frame, the second X-directional reference frame, and the second Y-directional reference frame, and wherein the reference frame combination comprises either a first combination or a second combination, wherein the first combination comprises the first X-directional reference frame and the first Y-directional reference frame, and wherein the second combination comprises the second X-directional reference frame and the second Y-directional reference frame.

8. The method of claim 1, further comprising determining, from the first reference frame list and the second reference frame list, whether a plurality of reference frame combinations that satisfy a condition D exists, wherein a quantity of the reference frame combinations is greater than or equal to 1 and less than a maximum quantity of the reference frame combinations.

9. The method of claim 8, wherein the condition D satisfies the following equation POC_Cur−POC_listX_i=POC_listY_i−POC_Cur, wherein POC_Cur represents a first picture order count (POC) value of a current frame in which the current picture block is located, wherein POC_listX_i represents a second POC value of a first reference frame, and wherein POC_listY_i represents a third POC value of a second reference frame.

10. The method of claim 8, wherein when the quantity of the reference frame combinations is 1, a first index value of a first reference frame combination in the first reference frame list and a second index value of the first reference frame combination in the second reference frame list are respectively set to the index values.

11. A method for obtaining a bidirectional inter prediction reference frame, comprising:
    determining a first reference frame list of a current picture block and a second reference frame list of the current picture block;
    determining, from the first reference frame list and the second reference frame list, whether a plurality of reference frame combinations that satisfy a condition D exists, wherein a quantity of the reference frame combinations is greater than or equal to 1 and less than a maximum quantity of the reference frame combinations, wherein the condition D satisfies the following equation POC_Cur−POC_listX_i=POC_listY_i−POC_Cur, wherein POC_Cur represents a first picture order count (POC) value of a current frame in which the current picture block is located, wherein POC_listX_i represents a second POC value of a first reference frame, and wherein POC_listY_i represents a third POC value of a second reference frame; and
    obtaining a plurality of index values of bidirectional reference frames of the current picture block in response to determining that one of the reference frame combinations exists.

12. The method of claim 11, wherein when the quantity of the reference frame combinations is 1, a first index value of a first reference frame combination in the first reference frame list and a second index value of the first reference frame combination in the second reference frame list are respectively set to the index values.

13. The method of claim 11, wherein when the quantity of the reference frame combinations is greater than 1, a first index value of an optimal reference frame combination in the first reference frame list and a second index value of the optimal reference frame combination in the second reference frame list are respectively set to the index values according to a preset rule.

14. The method of claim 13, wherein the preset rule uses as the optimal reference frame combination a reference frame combination with a smallest reference frame distance in the reference frame combinations.

15. A reference frame obtaining method for obtaining a bidirectional inter prediction reference frame, comprising:
    determining a first reference frame list of a current picture block and a second reference frame list of the current picture block;
    determining, from the first reference frame list, whether a first X-directional reference frame that satisfies a first condition exists;
    determining, from the first reference frame list, whether a second X-directional reference frame that satisfies a second condition exists;
    determining, from the second reference frame list, whether a first Y-directional reference frame that satisfies a third condition exists;
    determining, from the second reference frame list, whether a second Y-directional reference frame that satisfies a fourth condition exists;
    obtaining a plurality of index values of a plurality of bidirectional reference frames of the current picture block based on the first X-directional reference frame, the second X-directional reference frame, the first Y-directional reference frame, and the second Y-directional reference frame existing; and
    determining, from the first reference frame list and the second reference frame list, whether a plurality of reference frame combinations that satisfy a condition D exists, wherein the condition D satisfies the following equation POC_Cur−POC_listX_i=POC_listY_i−POC_Cur, wherein POC_Cur represents a first picture order count (POC) value of a current frame in which the current picture block is located, wherein POC_listX_i represents a second POC value of a first reference frame, and wherein POC_listY_i represents a third POC value of a second reference frame, and wherein the reference frame combinations comprise a first reference frame combination of the first X-directional reference frame and the first Y-directional reference frame based on both the first X-directional reference frame and the first Y-directional reference frame existing and a second reference frame combination of the second X-directional reference frame and the second Y-directional reference frame based on both the second X-directional reference frame and the second Y-directional reference frame existing.

16. The method of claim 15, wherein the first condition is that a first reference frame that is closest to a current frame has a first sequence number is less than a second sequence number of the current frame, wherein the third condition is that a second reference frame that is closest to the current frame has a third sequence number that is greater than the second sequence number, wherein the second condition is that a third reference frame that is closest to the current frame has a fourth sequence number that is greater than the second sequence number, wherein the fourth condition is that a fourth reference frame that is closest to the current frame has a fifth sequence number that is less than the second sequence number, and wherein the current frame includes the current picture block.

17. The method of claim 15, wherein based on the first reference frame combination existing and the second reference frame combination not existing, obtaining the index values comprises respectively setting the index values to a first index value of the first X-directional reference frame and a second index value of the first Y-directional reference frame.

18. The method of claim 15, wherein based on the second reference frame combination existing and the first reference frame combination not existing, obtaining the index values comprises respectively setting the index values to a first index value of the second X-directional reference frame and a second index value of the second Y-directional reference frame.

19. The method of claim 15, wherein based on the first reference frame combination existing and the second reference frame combination existing, the method further comprises:

determining, based on a preset condition, that the first X-directional reference frame exists and the first Y-directional reference frame exists or determining, based on the preset condition, that the second X-directional reference frame exists and the second Y-directional reference frame exists; and obtaining the index values.

20. The method of claim 19, wherein the preset condition uses a smaller span between a first span and a second span for obtaining the index values, wherein the first span is between the first X-directional reference frame and the first Y-directional reference frame, wherein the second span is between the second X-directional reference frame and the second Y-directional reference frame.

21. The method of claim 19, wherein the preset condition uses a reference frame combination as a basis for obtaining the index values, wherein the reference frame combination includes a first reference frame, wherein the first reference frame is a frame, closest to a current frame, of the first X-directional reference frame, the first Y-directional reference frame, the second X-directional reference frame, and the second Y-directional reference frame, and wherein the reference frame combination comprises either a first combination or a second combination, wherein the first combination comprises the first X-directional reference frame and the first Y-directional reference frame, and wherein the second combination comprises the second X-directional reference frame and the second Y-directional reference frame.

* * * * *